United States Patent
Okada et al.

(10) Patent No.: US 10,451,870 B2
(45) Date of Patent: Oct. 22, 2019

(54) OPTICAL SCANNING APPARATUS AND IMAGE FORMING APPARATUS

(71) Applicant: CANON KABUSHIKI KAISHA, Tokyo (JP)

(72) Inventors: Yuta Okada, Moriya (JP); Yuichiro Imai, Tokyo (JP); Daisuke Aruga, Abiko (JP); Takehiro Ishidate, Tokyo (JP); Yasuaki Otoguro, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 2 days.

(21) Appl. No.: 15/891,071

(22) Filed: Feb. 7, 2018

(65) Prior Publication Data

US 2018/0231770 A1 Aug. 16, 2018

(30) Foreign Application Priority Data

Feb. 15, 2017 (JP) .................................. 2017-025992

(51) Int. Cl.
*G02B 26/12* (2006.01)
*H04N 1/113* (2006.01)
(Continued)

(52) U.S. Cl.
CPC ............ *G02B 26/125* (2013.01); *B41J 2/471* (2013.01); *G02B 26/121* (2013.01);
(Continued)

(58) Field of Classification Search
CPC .. G02B 26/125; G02B 26/121; G02B 26/124; H04N 1/113; H04N 1/1215; B41J 2/471
(Continued)

(56) References Cited

U.S. PATENT DOCUMENTS 7,072,087 B2   7/2006  Nakahata .................... 359/204.1
7,298,390 B2  11/2007  Nakahata ....................... 347/231
(Continued)

FOREIGN PATENT DOCUMENTS

JP       2000-193902       7/2000
JP          4139030        8/2008

OTHER PUBLICATIONS

U.S. Appl. No. 15/702,219, filed Sep. 12, 2017.
(Continued)

*Primary Examiner* — Frank G Font
(74) *Attorney, Agent, or Firm* — Venable LLP

(57) ABSTRACT

An optical scanning apparatus includes: a casing having a bottom face; a cylindrical portion having a first opening through which a laser beam from a light source passes; a light-transmitting member arranged between the cylindrical portion and a rotary polygon mirror; a plate spring fixing the light-transmitting member; and a sealing member between the cylindrical portion and the plate spring, wherein a width of the first opening narrows progressively in a insertion direction of the plate spring, the sealing member comes into contact with the cylindrical portion in a first region when the plate spring is inserted, and in a second region closer to the bottom face than the first region, a region, in which the sealing member comes into contact with the cylindrical portion, expands toward a center part from two end portions of a leading end portion of the sealing member as the plate spring is inserted further.

18 Claims, 14 Drawing Sheets

(51) Int. Cl.
*B41J 2/47* (2006.01)
*H04N 1/12* (2006.01)

(52) U.S. Cl.
CPC ........... *G02B 26/124* (2013.01); *H04N 1/113* (2013.01); *H04N 1/1215* (2013.01)

(58) Field of Classification Search
USPC ...................................................... 359/216.1
See application file for complete search history.

(56) References Cited

U.S. PATENT DOCUMENTS

| | | | |
|---|---|---|---|
| 7,522,326 B1 | 4/2009 | Otoguro | 347/256 |
| 7,629,992 B2 | 12/2009 | Nakahata | 347/243 |
| 7,684,099 B2 | 3/2010 | Otoguro | 359/216.1 |
| 7,728,861 B2 | 6/2010 | Nakahata | 347/231 |
| 7,830,576 B2 | 11/2010 | Nakahata | 359/201.1 |
| 8,810,622 B2 | 8/2014 | Mamiya et al. | 347/242 |
| 8,917,305 B2 | 12/2014 | Nakahata et al. | 347/244 |
| 8,922,847 B2 | 12/2014 | Nakahata | 358/474 |
| 8,947,478 B2 | 2/2015 | Ishidate et al. | 347/137 |
| 9,086,645 B2 | 7/2015 | Otoguro et al. | G03G 15/0435 |
| 9,195,063 B2 | 11/2015 | Ishidate et al. | G02B 26/125 |
| 9,316,992 B2 | 4/2016 | Ishidate et al. | G03G 15/04036 |
| 9,400,444 B2 | 7/2016 | Sato et al. | G03G 15/043 |
| 9,493,014 B2 | 11/2016 | Aruga et al. | B41J 2/471 |
| 9,517,638 B2 | 12/2016 | Otoguro et al. | B41J 2/471 |
| 9,720,207 B2 | 8/2017 | Otoguro et al. | G03G 15/0435 |
| 9,772,577 B2 | 9/2017 | Ishidate et al. | G03G 15/043 |
| 2007/0196135 A1* | 8/2007 | Fukuta | G03G 15/0874 399/254 |
| 2009/0244670 A1 | 10/2009 | Sato et al. | 359/205.1 |
| 2012/0081770 A1 | 4/2012 | Sato et al. | 359/204.1 |
| 2016/0347083 A1 | 12/2016 | Ishidate | B41J 2/471 |
| 2017/0010558 A1 | 1/2017 | Ishidate et al. | B41J 2/47 |
| 2017/0064108 A1 | 3/2017 | Mamiya et al. | H04N 1/00525 |
| 2017/0336731 A1 | 11/2017 | Ishidate et al. | G03G 15/0435 |

OTHER PUBLICATIONS

U.S. Appl. No. 15/891,087, filed Feb. 7, 2018.
U.S. Appl. No. 15/891,064, filed Feb. 7, 2018.
U.S. Appl. No. 15/706,317, filed Sep. 15, 2017.
U.S. Appl. No. 15/720,644, filed Sep. 29, 2017.
U.S. Appl. No. 15/801,033, filed Nov. 1, 2017.
U.S. Appl. No. 15/895,818, filed Feb. 13, 2018.
U.S. Appl. No. 15/891,057, filed Feb. 7, 2018.
U.S. Appl. No. 15/889,045, filed Feb. 5, 2018.
U.S. Appl. No. 15/889,802, filed Feb. 6, 2018.
U.S. Appl. No. 15/889,052, filed Feb. 5, 2018.
U.S. Appl. No. 15/891,080, filed Feb. 7, 2018.
U.S. Appl. No. 15/908,482, filed Feb. 28, 2018.
U.S. Appl. No. 15/718,510, filed Sep. 28, 2017.

* cited by examiner

FIG. 5A
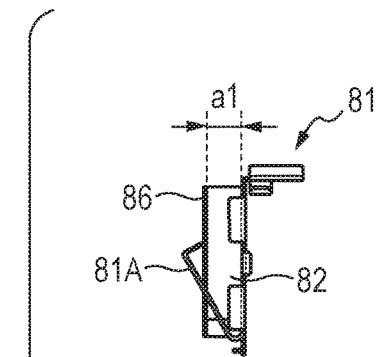
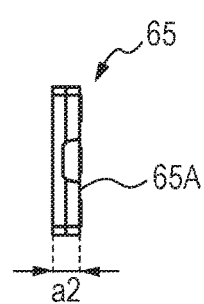
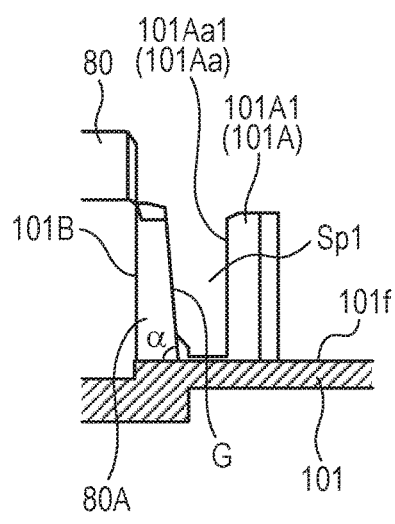
FIG. 5B
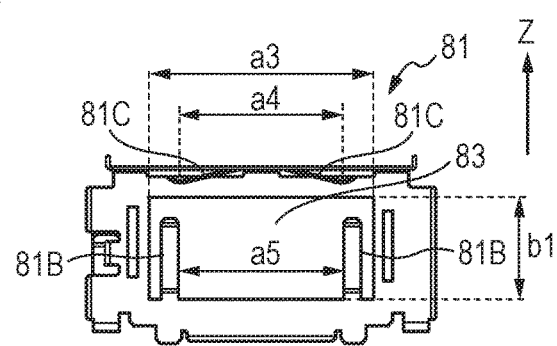
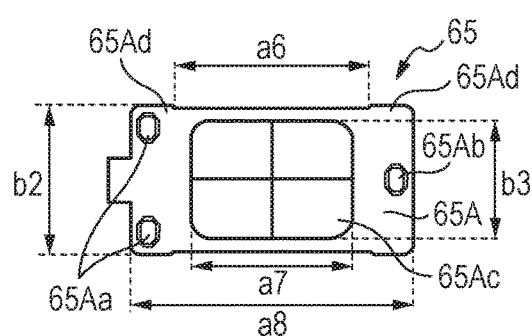
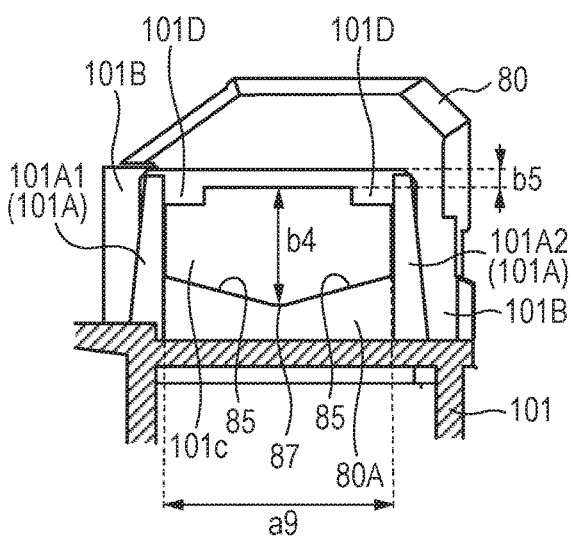

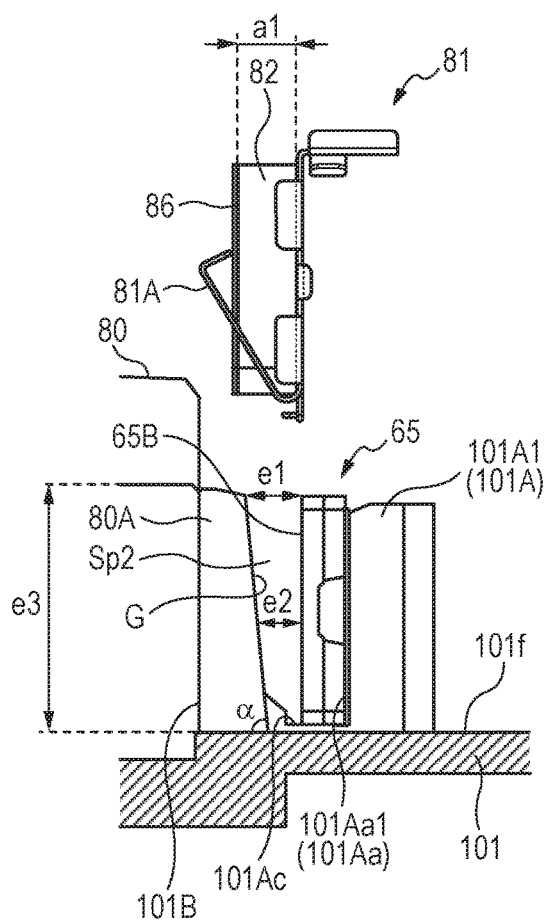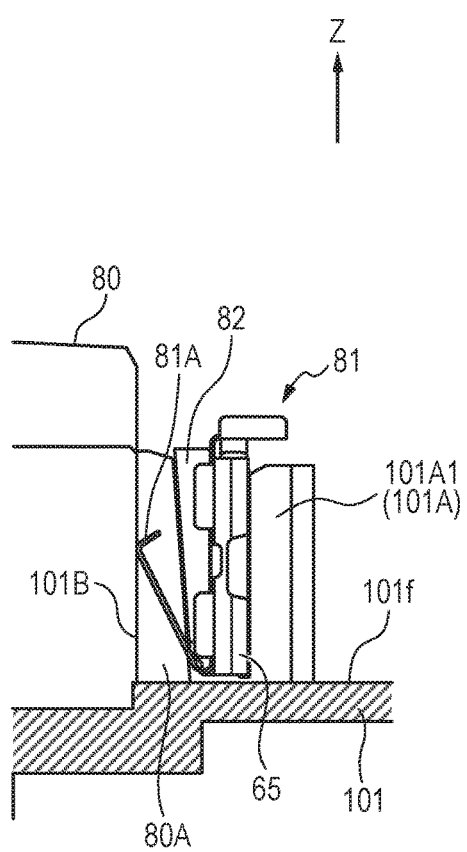

ha > hb > hc > hd

OPTICAL SCANNING APPARATUS AND IMAGE FORMING APPARATUS

BACKGROUND OF THE INVENTION

Field of the Invention

The present invention relates to an optical scanning apparatus that is used in an image forming apparatus such as a copier, a printer, a facsimile machine and a multifunction peripheral with these functions, and to an image forming apparatus equipped with the optical scanning apparatus.

Description of the Related Art

An optical scanning apparatus having the following configuration is well-known as an optical scanning apparatus used in an electrophotographic image forming apparatus. That is, the optical scanning apparatus forms a latent image on a photosensitive member by a process in which a light beam emitted from a light source is deflected by a rotary polygon mirror, and the deflected light beam is guided onto a photosensitive surface of the photosensitive member by optical components such as a lens and a mirror.

Inside the optical scanning apparatus, a deflector is provided that has a rotary polygon mirror for deflecting and scanning with a laser beam emitted from a semiconductor laser. The surface of the photosensitive member is scanned by the rotary polygon mirror with the laser beam, and lighting and lighting-out of the semiconductor laser are repeated in coordination with the motion of the photosensitive member to thereby obtain a predetermined latent image on the photosensitive member. The optical components inside the optical scanning apparatus are housed inside a casing of the optical scanning apparatus to protect the optical components from substances which cause dirt, that is, for protection against dust.

In recent years, with an increase in the scanning speed of the laser beams, the occurrence of a phenomenon (also called a "pump action") whereby air outside the optical scanning apparatus is sucked into the optical scanning apparatus by rotation of the rotary polygon mirror is increasing. Further, due to factors such as an increase in the degree of contamination in the usage environments of optical scanning apparatuses, demands have been increasing with respect to the degree of hermeticity of optical scanning apparatuses. For example, a configuration has been proposed in which a holder that holds a semiconductor laser is fitted in the casing, and gaps around the circumference of the semiconductor laser, around the circumference of the holder that holds the semiconductor laser, or between the semiconductor laser and the collimator lens are sealed using an elastic member for sealing (for example, see Japanese Patent No. 4139030). By this means, a rotary polygon mirror is sealed from external air. Further, a configuration has been proposed in which a rotary polygon mirror is sealed from external air by bringing an optical component, a casing and a cover into contact with each other (for example, see Japanese Patent Application Laid-Open No. 2000-193902).

According to the technology that seals a gap by means of an elastic member for sealing, it is necessary to mount the elastic member from a direction such that the elastic member passes through a fitting hole, and there is thus the risk that the assemblability declines. In the configuration that brings an optical component, a casing and a cover into contact with each other, resin and sheet metal that are both hard materials contact against each other. Consequently, there is a risk that the posture of the optical component will change and a gap will arise. To solve these problems, it is conceivable to insert the elastic member from a direction that is orthogonal to the direction in which the elastic member is compressed. However, because the elastic member is soft, there is a risk that when carrying out the assembly the elastic member will run onto the casing and consequently compression of the elastic member will not be adequately performed. FIG. 14 illustrates a state when an opening 1101c of a casing 1101 is sealed by an elastic member 182. In FIG. 14, a lower end portion 1101cb of a leading end portion 180A forming the opening 1101c of the casing 1101, and a lower end portion 182b (leading end portion in the insertion direction) of the elastic member 182 are designed to be substantially parallel. When the elastic member 182 is inserted from the insertion direction, in some cases the lower end portion 182b of the elastic member 182 runs onto the lower end portion 1101cb of the leading end portion 180A that forms the opening 1101c. In a case where the elastic member 182 is not compressed in a predetermined state, there is a risk of not being sealed from external air.

The present invention has been made in view of the above described circumstances, and an object of the present invention is to suppress the occurrence of sealing defects in a sealing member for sealing that is mounted in a casing.

SUMMARY OF THE INVENTION

To solve the aforementioned problem, the present invention has the following configurations.

(1) An optical scanning apparatus including: a light source; a rotary polygon mirror deflecting a laser beam which is emitted from the light source; a casing having a bottom face on which the rotary polygon mirror is mounted, and a side wall which is erected from the bottom face and on which the light source is mounted; a cylindrical portion that extends from the side wall toward inside of the casing and through that the laser beam emitted from the light source passes, wherein a first opening through which the laser beam passes is formed in an extended leading end portion of the cylindrical portion; a light-transmitting member arranged between the cylindrical portion and the rotary polygon mirror, and transmitting the laser beam which has passed through the first opening; a plate spring in that a second opening through which the laser beam passes is formed, and that is mounted in the casing by being inserted toward the bottom face of the casing to fix the light-transmitting member in the casing; and a sealing member in that a third opening through which the laser beam passes is formed, that is affixed to a face, which faces a side on which the light source is disposed, of the plate spring mounted in the casing, and that seals a gap between the leading end portion of the cylindrical portion and the plate spring; wherein at least a part of the first opening is formed so that a width in a first direction, which is orthogonal to an insertion direction of the plate spring and a normal direction of the first opening, narrows progressively in the insertion direction, a first region is in a face of the leading end portion of the cylindrical portion on a side facing the plate spring, in the first region, a leading end portion of the sealing member in the insertion direction comes into contact with the face of the leading end portion of the cylindrical portion by the sealing member sandwiched with the leading end portion of the cylindrical portion and the plate spring when the plate spring is begun to be inserted in the insertion direction, and a second region is closer to the bottom face of the casing than the first region, in the second region, a region, in which the leading end portion of the sealing member comes into contact with the face of the leading end portion of the cylindrical portion, expands toward a center part from two end portions of the leading end portion of the sealing member in the first direction as the plate spring is inserted further in the insertion direction.

(2) An optical scanning apparatus including: a light source; a rotary polygon mirror deflecting a laser beam which is emitted from the light source; a casing having a bottom face on which the rotary polygon mirror is mounted, and a side wall which is erected from the bottom face and on which the light source is mounted; a cylindrical portion that extends from the side wall toward inside of the casing and through that the laser beam emitted from the light source passes, wherein a first opening through which the laser beam passes is formed in an extended leading end portion of the cylindrical portion; a light-transmitting member arranged between the cylindrical portion and the rotary polygon mirror, and transmitting the laser beam which has passed through the first opening; a plate spring in that a second opening through which the laser beam passes is formed, and that is mounted in the casing by being inserted toward the bottom face of the casing to fix the light-transmitting member in the casing; and a sealing member in that a third opening through which the laser beam passes is formed, that is affixed to a face, which faces a side on which the light source is disposed, of the plate spring mounted in the casing, and that seals a gap between the leading end portion of the cylindrical portion and the plate spring, wherein the sealing member is formed so that a distance in an insertion direction of the plate spring between a leading end portion of the sealing member in the insertion direction and the bottom face increases toward a center part from two end portions of the sealing member in a first direction which is orthogonal to the insertion direction and a normal direction of the first opening, wherein a first region is in a face of the leading end portion of the cylindrical portion on a side facing the plate spring, in the first region, a leading end portion of the sealing member comes into contact with the face of the leading end portion of the cylindrical portion by the sealing member sandwiched with the leading end portion of the cylindrical portion and the plate spring when the plate spring is begun to be inserted in the insertion direction, and a second region is closer to the bottom face of the casing than the first region, in the second region, a region, in which the leading end portion of the sealing member comes into contact with the face of the leading end portion of the cylindrical portion, expands toward the center part from the two end portions of the leading end portion of the sealing member in the first direction as the plate spring is inserted further in the insertion direction.

(3) An image forming apparatus including: an optical scanning apparatus according to any one of the aforementioned (1) or (2); a photosensitive member on which a latent image is formed by being scanned with the laser beam from the optical scanning apparatus; a developing unit that develops the latent image formed on the photosensitive member with toner to form a toner image; and a transfer unit that transfers the toner image formed by the developing unit to a transfer target.

According to the present invention, the occurrence of a sealing defect in a sealing member for sealing that is mounted in a casing can be suppressed.

Further features of the present invention will become apparent from the following description of exemplary embodiments with reference to the attached drawings.

BRIEF DESCRIPTION OF THE DRAWINGS

FIG. 5A is a side view illustrating the configuration around an opening of the cylindrical portion according to the exemplary embodiment.

FIG. 5B is a front view illustrating the configuration around the opening of the cylindrical portion according to the exemplary embodiment.

FIG. 8A is a side view illustrating the assembly of components around the opening according to the exemplary embodiment.

FIG. 8B is a side view illustrating the assembly of components around the opening according to the exemplary embodiment.

DESCRIPTION OF THE EMBODIMENTS

Embodiments for carrying out the present invention will now be described in detail by way of an exemplary embodiment with reference to the accompanying drawings. In the following description, the rotation axis direction of a rotary polygon mirror is the Z-axis direction, the longitudinal direction of an optical member is the Y-axis direction, and a direction orthogonal to the Y-axis and Z-axis is the X-axis direction. The rotation direction of the rotary polygon mirror is a main scanning direction as a first direction. A direction orthogonal to the main scanning direction is a sub-scanning direction. In this case, the main scanning direction may be parallel to the Y-axis or X-axis in some cases, and the sub-scanning direction may sometimes be parallel to the Z-axis in some cases.

Exemplary Embodiment

[Configuration of Image Forming Apparatus]

Figure 1:
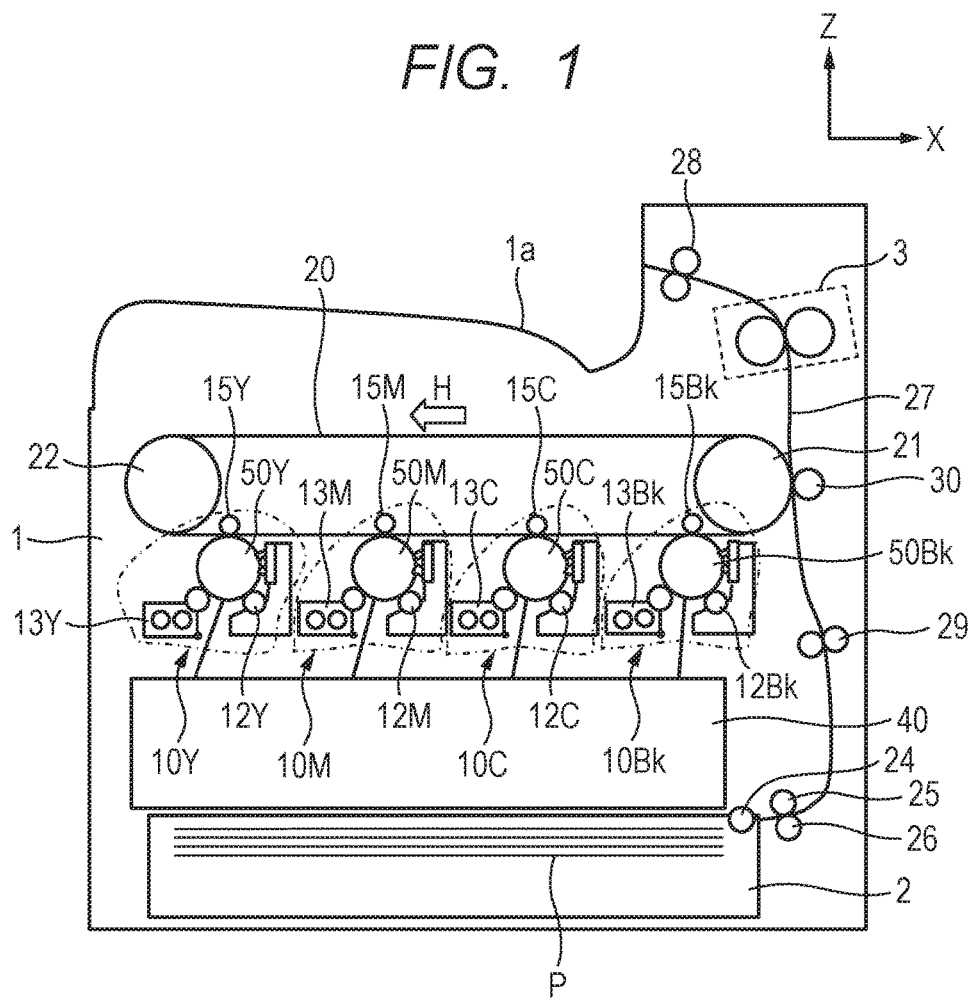
FIG. 1 is a schematic view of an image forming apparatus according to an exemplary embodiment of the present invention.

A configuration of an image forming apparatus according to an exemplary embodiment will now be described. FIG. 1 is a schematic configuration diagram illustrating the overall configuration of a tandem-type color laser beam printer according to the exemplary embodiment. The laser beam printer (hereinafter, simply referred to as a "printer") includes four image forming engines 10Y, 10M, 10C and 10Bk (indicated by alternate long and short dashed lines in the drawing) that are configured to form a toner image of the colors yellow (Y), magenta (M), cyan (C) and black (Bk), respectively. Further, the printer includes an intermediate transfer belt 20 as a transfer target onto which the respective toner images are transferred from the respective image forming engines 10Y, 10M, 10C and 10Bk. The printer transfers the toner images that have been transferred in multiple layers onto the intermediate transfer belt 20 onto a recording sheet P as a recording medium, to thereby form a full color image. In the following description, the symbols Y, M, C and Bk representing the respective colors are omitted unless otherwise necessary.

The intermediate transfer belt 20 is formed in an endless shape, and is suspended around a pair of belt conveyance rollers 21 and 22. While the intermediate transfer belt 20 is moved to rotate in a direction indicated by an arrow H, the toner images formed by the respective image forming engines 10 are transferred onto the intermediate transfer belt 20. A secondary transfer roller 30 is arranged at a position opposite to the belt conveyance roller 21 in a manner sandwiching the intermediate transfer belt 20 therebetween. The recording sheet P is passed between the secondary transfer roller 30 and the intermediate transfer belt 20 that are in pressure contact with each other, and the toner image is thereby transferred onto the recording sheet P from the intermediate transfer belt 20. The four image forming engines 10Y, 10M, 10C and 10Bk are arranged in parallel on the underside of the intermediate transfer belt 20, and transfer toner images that have been formed in accordance with image information of the respective colors onto the intermediate transfer belt 20 (hereinafter, this operation is referred to as "primary transfer"). The four image forming engines 10 are arranged along a rotation direction (the arrow H direction) of the intermediate transfer belt 20 in the following order: the image forming engine 10Y for yellow, the image forming engine 10M for magenta, the image forming engine 10C for cyan, and the image forming engine 10Bk for black.

An optical scanning apparatus 40 is arranged below the image forming engines 10. In accordance with the image information, the optical scanning apparatus 40 exposes with light a photosensitive drum 50 serving as a photosensitive member provided in each of the image forming engines 10. A detailed illustration and description of the optical scanning apparatus 40 is omitted from FIG. 1, and the optical scanning apparatus 40 will be described later using FIGS. 2A and 2B. The optical scanning apparatus 40 is shared by all the image forming engines 10Y, 10M, 10C and 10Bk, and includes four semiconductor lasers (not shown) that are each configured to emit a laser beam modulated in accordance with image information for each color. The optical scanning apparatus 40 also includes a deflector. The deflector has a rotary polygon mirror 42 that is configured to rotate at a high speed and deflects the laser beams of these four optical paths so as to scan the corresponding photosensitive drum 50 with the respective laser beams along the rotation axis direction (the Y-axis direction) thereof, and has a scanner motor 41 configured to rotate the rotary polygon mirror 42 (see FIGS. 2A and 2B). The deflector includes the rotary polygon mirror 42, the scanner motor 41 that is a driving unit configured to drive a motor that rotates the rotary polygon mirror 42, and a substrate on which the motor and the scanner motor 41 are mounted. Each laser beam, which is used when the rotary polygon mirror 42 scans, proceeds along a predetermined path while being guided by optical members arranged inside the optical scanning apparatus 40. The respective photosensitive drums 50 of the respective image forming engines 10 are then exposed with light by the respective laser beams that proceeded along the predetermined paths and passed through respective irradiation ports (not shown) provided in the upper part of the optical scanning apparatus 40.

Each image forming engine 10 includes the photosensitive drum 50, and a charging roller 12 configured to uniformly charge the photosensitive drum 50 to the electric potential of a background portion. Further, each image forming engine 10 includes a developing device 13 configured to develop an electrostatic latent image which is formed on the photosensitive drum 50 (on the photosensitive member) by exposure with the laser beam, to thereby form a toner image. The developing devices 13 form the toner images in accordance with the image information for the respective colors on the photosensitive drums 50 that are photosensitive members.

A primary transfer roller 15 is arranged at a position opposite the photosensitive drum 50 of each image forming engine 10 so as to sandwich the intermediate transfer belt 20 therebetween. By applying a predetermined transfer voltage to the primary transfer roller 15, the toner image on the photosensitive drum 50 is transferred onto the intermediate transfer belt 20.

The recording sheet P is fed from a paper cassette 2 provided in a lower portion of a printer casing 1 into the inside of the printer, specifically, to a secondary transfer position at which the intermediate transfer belt 20 and the secondary transfer roller 30 are in contact with each other. A pick-up roller 24 for drawing out the recording sheet P contained in the paper cassette 2 and a sheet feed roller 25 are arranged in parallel at an upper portion of the paper cassette 2. A retard roller 26 configured to prevent double feeding of the recording sheets P is arranged at a position opposite the sheet feed roller 25. A conveyance path 27 for the recording sheet P inside the printer is provided substantially vertically along a right side face of the printer casing 1. The recording sheet P that is drawn out from the paper cassette 2 positioned at a bottom portion of the printer casing 1 is conveyed upward along the conveyance path 27 and fed to registration rollers 29 which control the timing of the entry of the recording sheet P to the secondary transfer position. Thereafter, the toner image is transferred onto the recording sheet P at the secondary transfer position, and the recording sheet P is then fed to a fixing device 3 (illustrated by a broken line) that is provided on the downstream side in the conveyance direction. The recording sheet P on which the toner image has been fixed by the fixing device 3 is delivered via delivery rollers 28 onto a delivery tray 1a provided at an upper portion of the printer casing 1. When forming a full color image by means of this color laser beam printer, first the optical scanning apparatus 40 exposes the photosensitive drum 50 of each image forming engine 10 at a predetermined timing in accordance with image information for each color.

[Optical Scanning Apparatus]

Figure 2A:
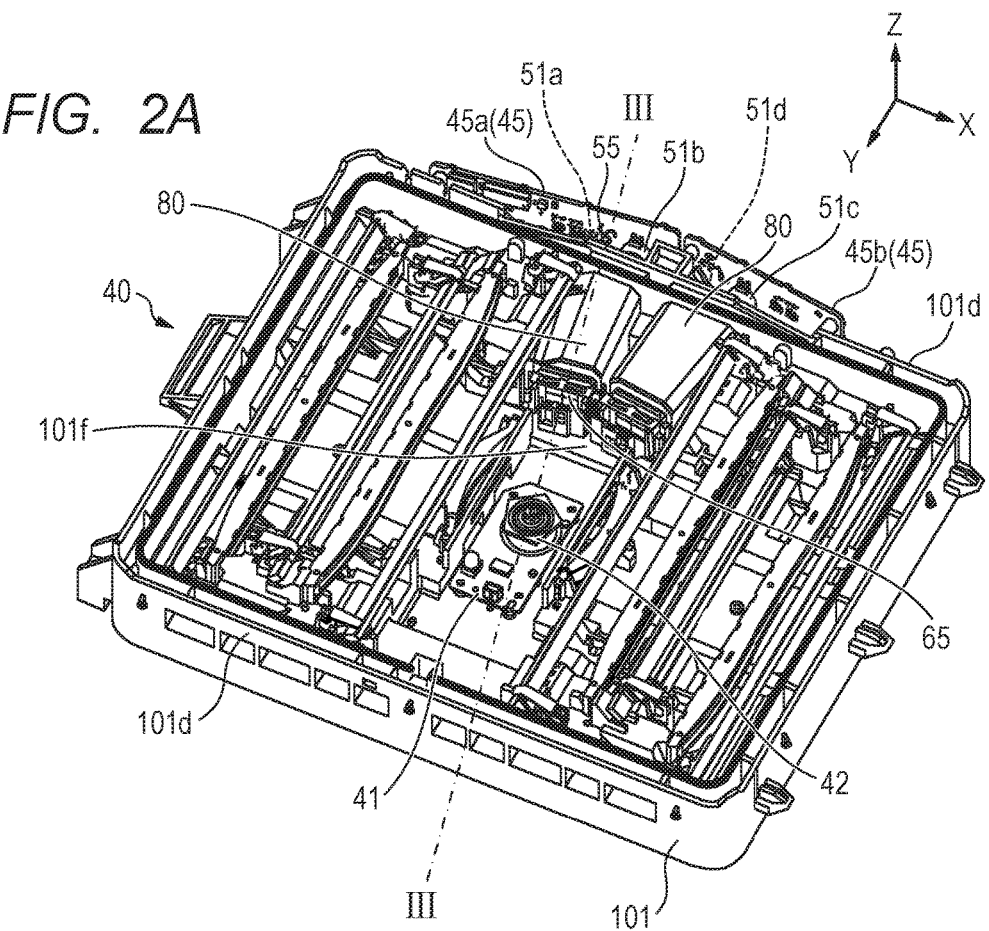
FIG. 2A is a perspective view of an optical scanning apparatus according to the exemplary embodiment.

FIG. 2A is a perspective view of the optical scanning apparatus 40 in a state in which an upper cover 69 (see FIG. 2B) of the optical scanning apparatus 40 has been taken off and the rotary polygon mirror 42 and the optical components are visible. For example, in the exemplary embodiment, one light source unit is provided for each image forming engine. Specifically, a light source unit 51a corresponds to the image forming engine 10Y, a light source unit 51b corresponds to the image forming engine 10M, a light source unit 51c corresponds to the image forming engine 10C and a light source unit 51d corresponds to the image forming engine 10Bk. In the following description, the suffixes a to d of the reference symbols are omitted unless otherwise required. The light source units 51 as light sources are mounted on circuit boards 45 together with a laser driver (not illustrated) that drives the light source units 51. The circuit boards 45 are mounted on a side-wall face 101d (side wall) that is erected from a bottom face 101f of the casing 101. Specifically, two light source units 51a and 51b as a plurality of light sources are mounted on a circuit board 45a, and two light source units 51c and 51d are mounted on a circuit board 45b. The light source units 51a and 51b are mounted on the circuit board 45a so that the optical paths of respective laser beams emitted therefrom have an angular difference with respect to each other in the main scanning direction and the sub-scanning direction. As illustrated in FIG. 2A, the two circuit boards 45a and 45b are mounted on the side-wall face 101d of the casing 101. A light-receiving sensor 55 is mounted on the circuit board 45a.

The rotary polygon mirror 42 that deflects laser beams emitted from the light source units 51, and the scanner motor 41 that rotates the rotary polygon mirror 42 are mounted on the bottom face 101f of the casing 101. The laser beams emitted from the light source units 51 are reflected by the rotary polygon mirror 42, and the laser beam that are reflected by the rotary polygon mirror 42 travel toward the photosensitive drums 50 that have surfaces to be scanned. The laser beams reflected by the rotary polygon mirror 42 travel toward the light-receiving sensor 55 as a detecting unit that is mounted on the circuit board 45a.

It is necessary to perform operations in a state in which a time period from a timing at which each laser beam is received by the light-receiving sensor 55 until formation of a latent image by the laser beam on the photosensitive drum 50 is started is kept constant. The light-receiving sensor 55 is provided to cause operations to be performed while keeping this time period constant. That is, the light-receiving sensor 55 is used for determining the timings at which laser beams are emitted from the light source units 51a and 51b. The light-receiving sensor 55 is disposed directly above (in the +Z direction) the light source unit 51a. A laser beam travelling toward the light-receiving sensor 55 and the laser beam emitted from the light source unit 51a are in a relation such that there is no angular difference therebetween in the main scanning direction. A plurality of the light source units 51 are provided in the optical scanning apparatus 40. For example, the light source units 51a and 51b and the light source units 51c and 51d are provided on a +X side and a −X side, respectively, based on a YZ plane that includes the rotational axis of the rotary polygon mirror 42. For example, with respect to the optical paths of laser beams emitted from each of the light source unit 51a and the light source unit 51b that are two light sources on one of the sides, an angular difference in the main scanning direction is provided in the respective optical paths. The reason an angular difference is provided in the main scanning direction with regard to the optical paths of the laser beams emitted from the two light source units 51a and 51b is as follows. That is, in order to arrange the light source units 51a and 51b so that an oblique incidence angle in the sub-scanning direction of each of the light source units 51a and 51b is small even if the size of the light source units 51a and 51b is large, an angular difference is respectively provided in the main scanning direction with respect to the optical paths of the two laser beams.

Figure 3:
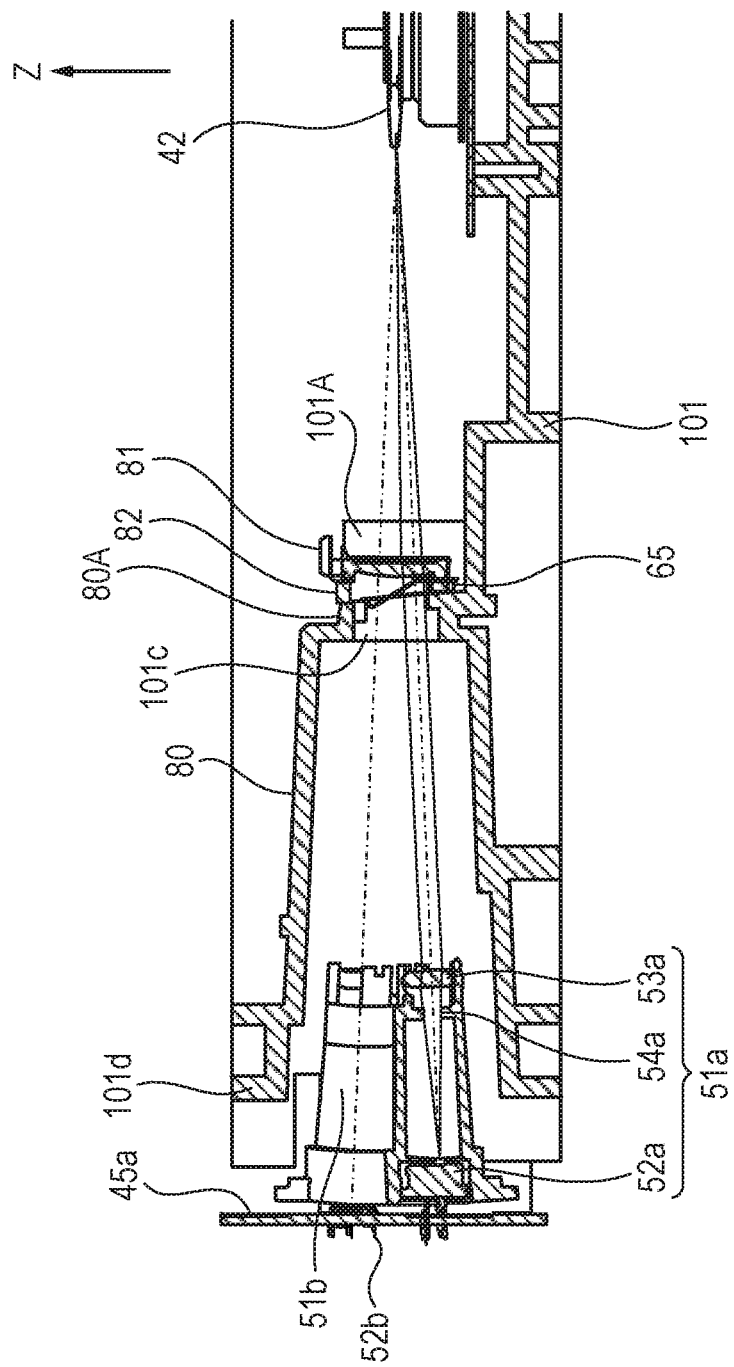
FIG. 3 is an enlarged cross-sectional view illustrating a configuration from a light source to a rotary polygon mirror of the optical scanning apparatus according to the exemplary embodiment.

When the circuit boards 45 are mounted on the side-wall face 101d of the optical scanning apparatus 40, the light source unit 51 protrudes into inside of the optical scanning apparatus 40 (see FIG. 3). Therefore, the casing 101 has partition wall portions (hereunder, referred to as "cylindrical portions 80") which are shaped so as to cover the respective light source units 51. Openings 101c as first openings for guiding the laser beams emitted from the light source units 51 to the rotary polygon mirror 42 are provided in the side-wall face 101d of the casing 101 on which the circuit boards 45 are mounted (see FIG. 3 and FIG. 4). Each opening 101c connects the inside of the optical scanning apparatus 40 with the outside of the optical scanning apparatus 40. That is, it is possible for external air that is outside the optical scanning apparatus 40 to enter into the optical scanning apparatus 40 through the openings 101c. Therefore, it is necessary for each opening 101c to be sealed with a sealing member that seals the opening 101c. The openings 101c are provided in extended leading end portions 80A of the cylindrical portions 80 (see FIG. 3 and FIG. 4) at which sealing members are easy to attach. The laser beams emitted from the light source units 51 pass through the inside of the cylindrical portions 80, and pass through the openings 101c. The openings 101c are provided to allow the laser beams emitted from the light source units 51 to pass through to the inside of the casing 101 from outside of the casing 101. The openings 101c are also provided to allow the laser beams from inside the casing 101 to pass through to outside the casing 101, so that the laser beams reflected by the rotary polygon mirror 42 are received by the light-receiving sensor 55. The cylindrical portions 80 and the cylindrical lenses 65 will be described later.

[Optical Path of Laser Beam]

Figure 2B:
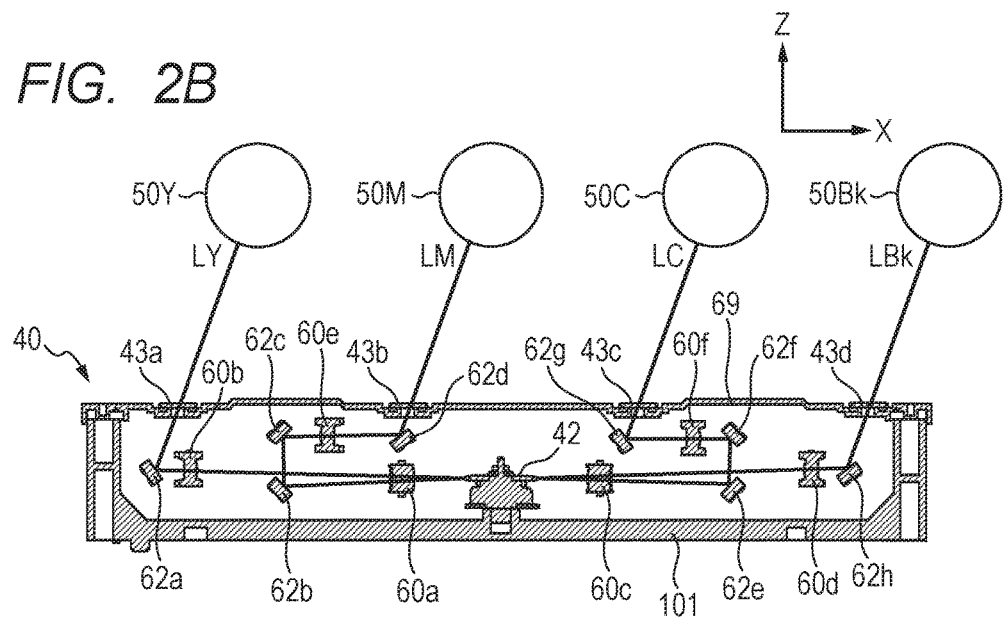
FIG. 2B is a cross-sectional view of the optical scanning apparatus according to the exemplary embodiment.

Optical lenses 60a, 60b, 60c, 60d, 60e and 60f for guiding the respective laser beams onto the corresponding photosensitive drums 50 to form an image and reflection mirrors 62a, 62b, 62c, 62d, 62e, 62f, 62g and 62h that are optical components are arranged in the optical scanning apparatus 40. To facilitate viewing of the illustration in the drawing, reference characters 60a to 60f, and 62a to 62h are not shown in FIG. 2A. The casing 101 contains the rotary polygon mirror 42 and the reflection mirrors 62a to 62h. The manner in which the laser beams are guided to the photosensitive drums 50 by the optical lenses 60a to 60f and the reflection mirrors 62a to 62h will now be described using FIG. 2B. FIG. 2B is a schematic cross-sectional view illustrating an overall image of the optical scanning apparatus 40 in which the optical components are attached. A laser beam LY corresponding to the photosensitive drum 50Y and emitted from the light source unit 51a is deflected by the rotary polygon mirror 42 and is incident to the optical lens 60a. The laser beam LY passes through the optical lens 60a and is incident to the optical lens 60b. After passing through the optical lens 60b, the laser beam LY is reflected by the reflection mirror 62a. The laser beam LY that has been reflected by the reflection mirror 62a passes through a transparent window 43a and scans the photosensitive drum 50Y.

A laser beam LM corresponding to the photosensitive drum 50M that is emitted from the light source unit 51b is deflected by the rotary polygon mirror 42 and is incident to the optical lens 60a. The laser beam LM passes through the optical lens 60a, is reflected by the reflection mirror 62b and the reflection mirror 62c, and is incident to the optical lens 60e. After passing through the optical lens 60e, the laser beam LM is reflected by the reflection mirror 62d. The laser beam LM that has been reflected by the reflection mirror 62d passes through a transparent window 43b and scans the photosensitive drum 50M.

A laser beam LC corresponding to the photosensitive drum 50C that is emitted from the light source unit 51c is deflected by the rotary polygon mirror 42 and is incident to the optical lens 60c. The laser beam LC passes through the optical lens 60c, is reflected by the reflection mirror 62e and the reflection mirror 62f, and is incident to the optical lens 60f. After passing through the optical lens 60f, the laser beam LC is reflected by the reflection mirror 62g. The laser beam LC that has been reflected by the reflection mirror 62g passes through a transparent window 43c and scans the photosensitive drum 50C.

A laser beam LBk corresponding to the photosensitive drum 50Bk that is emitted from the light source unit 51d is deflected by the rotary polygon mirror 42 and is incident to the optical lens 60c. The laser beam LBk passes through the optical lens 60c and is incident to the optical lens 60d. After passing through the optical lens 60d, the laser beam LBk is reflected by the reflection mirror 62h. The laser beam LBk that has been reflected by the reflection mirror 62h passes through a transparent window 43d and scans the photosensitive drum 50Bk. In the following description, the optical lenses 60a to 60d are described generically as "optical lens(es) 60", and the reflection mirrors 62a to 62h are described generically as "reflection mirror(s) 62".

[Cylindrical Portion]

Figure 4:
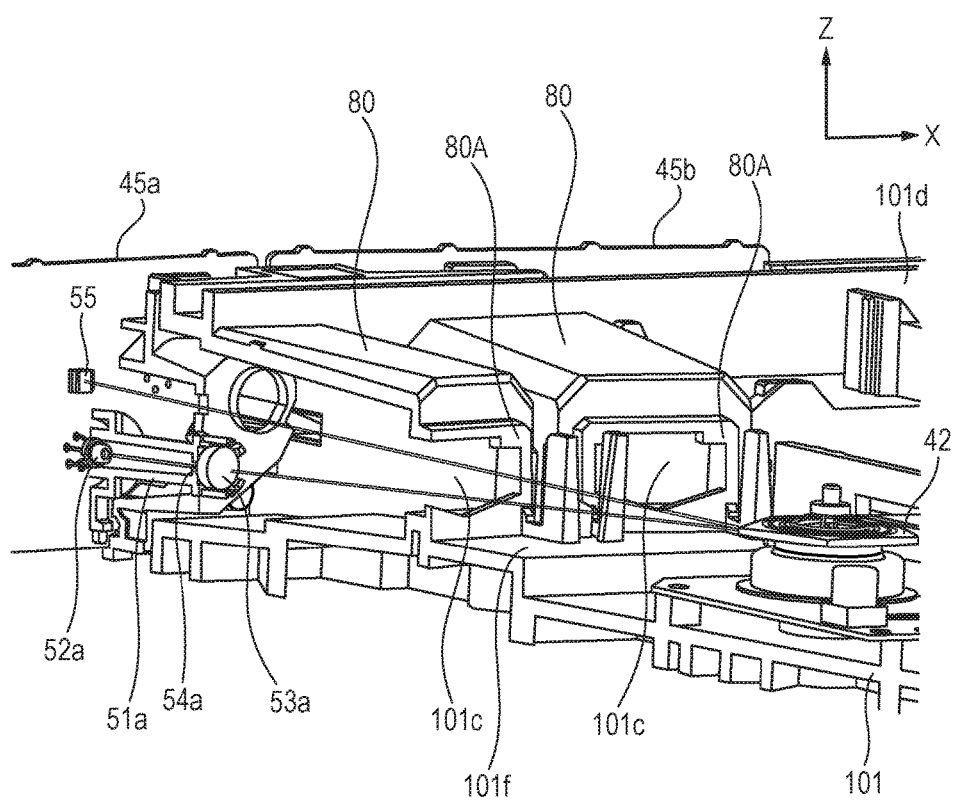
FIG. 4 is a perspective view illustrating the inside of a cylindrical portion of the optical scanning apparatus according to the exemplary embodiment.

FIG. 3 is a cross-sectional view along a line III-III in FIG. 2A, and is a cross-sectional view taken along a plane which passes through the light source unit 51a and the rotational axis of the rotary polygon mirror 42 and which is parallel to the rotational axis of the rotary polygon mirror 42. FIG. 4 is a perspective view in which the cross-section illustrated in FIG. 3 is seen from the rotary polygon mirror 42 side, and from which the cylindrical lenses 65 shown in FIG. 3 are omitted so that the openings 101c of the cylindrical portions 80 can be seen. The light source unit 51a has a semiconductor laser 52a, a collimator lens 53a and a diaphragm 54a. The light source units 51b, 51c and 51d are configured similarly to the light source unit 51a. Diffused light emitted from the semiconductor laser 52a is converted to parallel light by the collimator lens 53a. A laser beam that is formed into parallel light by the collimator lens 53a is converged onto a mirror face of the rotary polygon mirror 42 by the cylindrical lens 65. The cylindrical lenses 65 are light-transmitting members that are provided between the cylindrical portions 80 and the rotary polygon mirror 42, and that transmit laser beams that have passed through the openings 101c.

To miniaturize the optical scanning apparatus 40, the light source unit 51 is mounted on the side-wall face 101d of the casing 101. The cylindrical portions 80 that cover the light source units 51 are provided in the casing 101. In order to create a distance between the collimator lenses 53 and the cylindrical lenses 65, as illustrated in FIG. 3, each cylindrical portion 80 is formed in a tunnel shape that projects into the inside (rotary polygon mirror 42 side) of the casing 101. The openings 101c through which laser beams emitted from the light source units 51 pass are provided in the casing 101. In the cylindrical portions 80, the openings 101c are provided in the leading end portions 80A that are the end portions on the rotary polygon mirror 42 side. To improve the dust resistance inside the casing 101, the cylindrical portions 80 extend from the side-wall face 101d of the casing 101 to the vicinity of the cylindrical lenses 65, and are formed integrally with the casing 101. Support portions 101A of the casing 101, plate springs 81 and sealing members 82 which are illustrated in FIG. 3 are described later.

[Configuration in Vicinity of Cylindrical Lenses 65]

(Cylindrical Lens 65)

Figure 6:
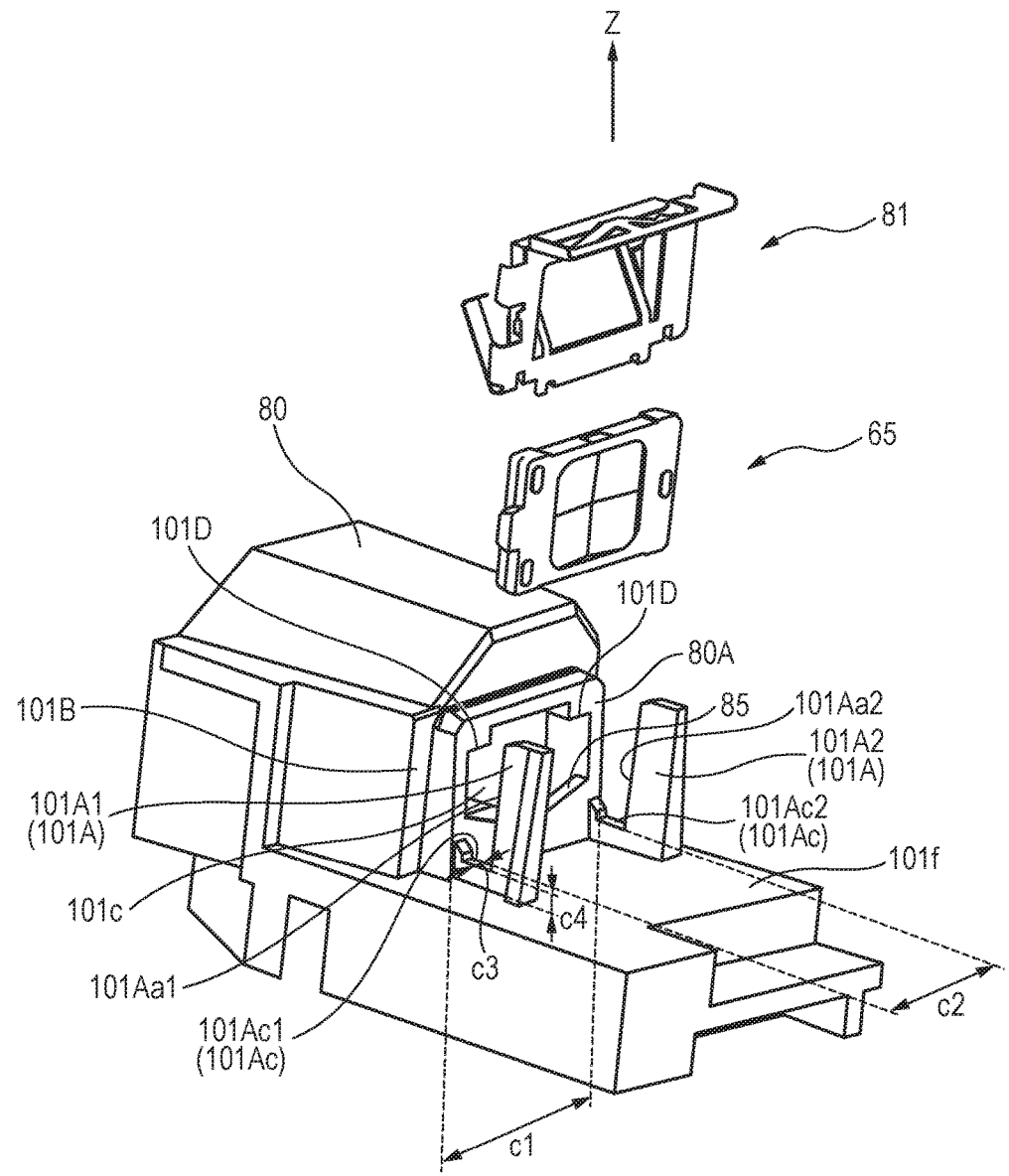
FIG. 6 is an exploded perspective view illustrating the configuration around the opening of the cylindrical portion according to the exemplary embodiment.

The configuration in the vicinity of the cylindrical lenses 65 will now be described using FIGS. 5A and 5B and FIGS. 11A and 11B. FIG. 5A is an exploded view of the area around each opening 101c as viewed from the same direction as FIG. 3. FIG. 5B is an exploded view of the area around each opening 101c as viewed from the rotary polygon mirror 42 side. FIG. 6 is an exploded perspective view of the area around each opening 101c as viewed from the rotary polygon mirror 42 side. The cylindrical lenses 65 are mounted in the casing 101 by means of the plate springs 81. A surface 65A that faces toward a side on which the rotary polygon mirror 42 is disposed of each cylindrical lens 65 that is mounted in the casing 101 serves as a reference surface when installing the cylindrical lens 65. The support portions 101A that supports the cylindrical lenses 65 when mounting the cylindrical lenses 65 are provided in the casing 101. The support portions 101A have reference surfaces 101Aa that face the light source units 51 side.

As illustrated in FIG. 5B, abutting portions 65Aa and 65Ab that abut against the reference surface 101Aa of each support portion 101A of the casing 101 are provided on the surface 65A of each cylindrical lens 65. Each support portion 101A of the casing 101 has two support portions, that is a support portion 101A1 that abuts against the abutting portion 65Aa, and a support portion 101A2 that abuts against the abutting portion 65Ab. As illustrated in FIG. 6, a distance c2 in the main scanning direction between the support portion 101A1 and the support portion 101A2 is, for example, 26.2 mm. As illustrated in FIG. 6, the support portions 101A1 and 101A2 have a support surface 101Ac1 and a support surface 101Ac2, respectively, that support the cylindrical lens 65. Hereinafter, the support surfaces 101Ac1 and 101Ac2 may also be referred to simply as "support surfaces 101Ac". In the support surfaces 101Ac1 and 101Ac2, a distance c4 (height) in the Z direction from the bottom face 101f of the casing 101 is, for example, 2.6 mm, and a length c3 (width) in the main scanning direction is, for example, 2 mm. The reference surface of each support portion 101A1 will be referred to herein as "reference surface 101Aa1", and the reference surface of each support portion 101A2 will be referred to as "reference surface 101Aa2". Positioning of the cylindrical lens 65 is performed by way of the abutting portions 65Aa and 65Ab of the surface 65A abutting against the respective reference surfaces 101Aa1 and 101Aa2 of the support portions 101A1 and 101A2 of the casing 101.

As illustrated in FIG. 5A, a thickness a2 of the cylindrical lens 65 is, for example, 3.2 mm. As illustrated in FIG. 5B, in the cylindrical lens 65, a lens portion 65Ac functioning as a lens has a length a7 (width (horizontal)) in the main scanning direction of, for example, 18 mm, and has a length b3 (width (vertical)) in the sub-scanning direction of, for example, 13.5 mm. A convex portion 65Ad is provided at two end portions in the main scanning direction of the surface 65A surrounding the lens portion 65Ac of the cylindrical lens 65. A distance a6 in the main scanning direction between the convex portions 65Ad is, for example, 23 mm. A length a8 (width (horizontal) of the cylindrical lens 65) in the main scanning direction of the surface 65A of the cylindrical lens 65 is, for example, 32.2 mm. A length b2 (width (vertical) of the cylindrical lens 65) in the sub-scanning direction of the surface 65A of the cylindrical lens 65 is, for example, 17 mm.

(Plate Spring 81)

Figure 7:
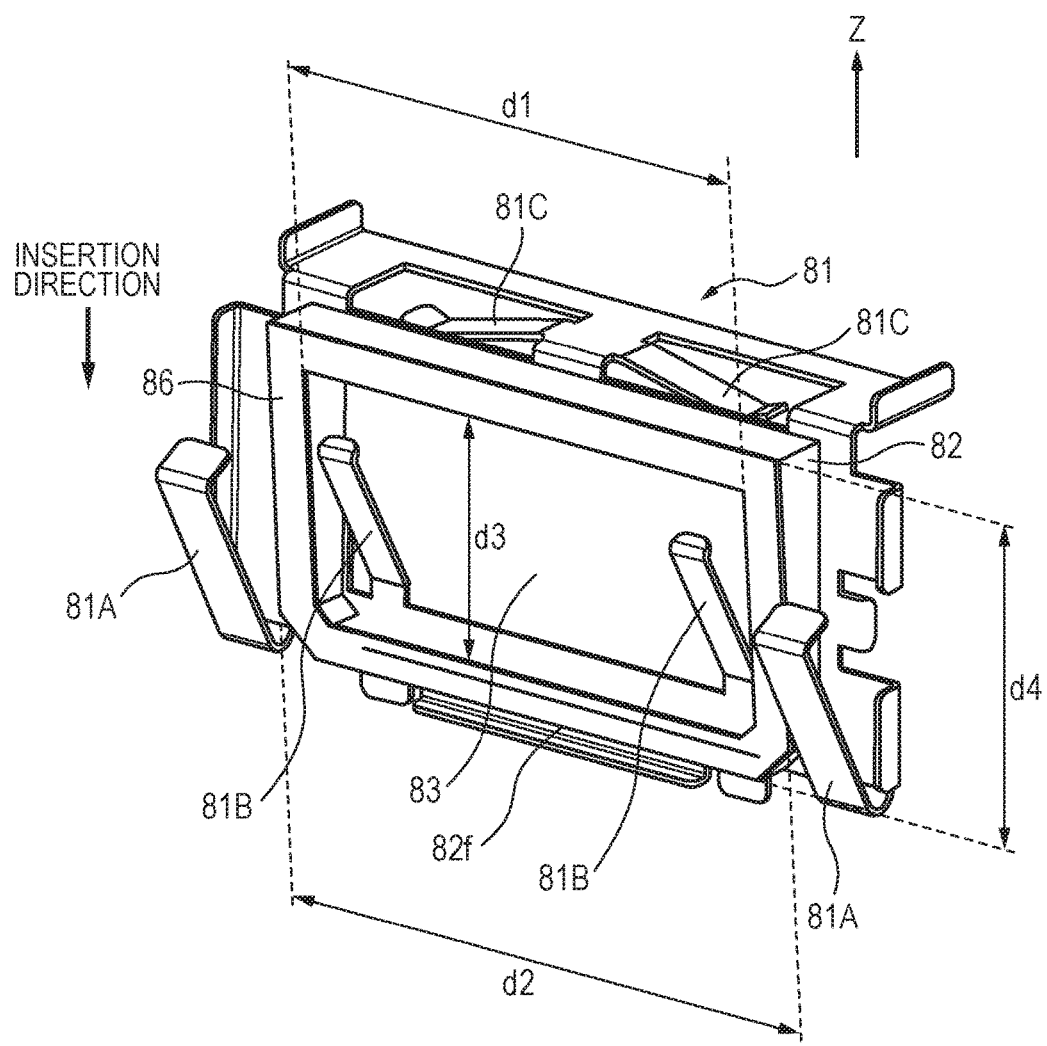
FIG. 7 is a perspective view illustrating the configuration of a plate spring of the exemplary embodiment.

Each plate spring 81 will now be described. FIG. 7 is a perspective view of the plate spring 81 as viewed from the light source unit 51 side. The plate spring 81 has an opening 83 that is a second opening through which the laser beam passes. In order to fix the cylindrical lens 65 in the casing 101, the plate spring 81 is mounted in the casing 101 by being inserted in an insertion direction that is the direction toward the bottom face 101f of the casing 101. The cylindrical lens 65 is urged to the rotary polygon mirror side and fixed in the casing 101 by the plate spring 81.

In the plate spring 81, the sealing member 82 is affixed to the side of the opening 101c of the cylindrical portion 80. The sealing member 82 has a third opening through which a laser beam passes. In the present exemplary embodiment, the third opening of the sealing member 82 indicates the same region as the opening 83 of the plate spring 81 when the sealing member 82 is affixed to the plate spring 81. Therefore, hereinafter, the third opening of the sealing member 82 is also referred to as the opening 83. The sealing member 82 is affixed to a face of the plate spring which is mounted in the casing 101. The face faces toward the side on which the light source unit 51 is disposed. The sealing member 82 seals a space between the leading end portion 80A of the cylindrical portion 80 and the cylindrical lens 65. Since the sealing member 82 is affixed to the plate spring 81, it can also be said that the sealing member 82 seals a gap formed between the leading end portion 80A of the cylindrical portion 80 and the plate spring 81. For example, the sealing member 82 is fixed by means of double-sided tape to the plate spring 81, and is integrated with the plate spring 81. The sealing member 82 is an elastic member, and for example is a sponge-like foam member. The sealing member 82 may also be a gum-like or gel-like member that has elasticity.

A sheet member 86 is affixed to the sealing member 82 on a surface thereof that is on the side of the opening 101c of the cylindrical portion 80. The sheet member 86 has a fourth opening through which a laser beam passes. In the present exemplary embodiment, the fourth opening of the sheet member 86 indicates the same region as the opening 83 of the plate spring 81 when the sheet member 86 is affixed to the sealing member 82. Therefore, hereinafter, the fourth opening of the sheet member 86 is also referred to as the opening 83. The sheet member 86 is affixed to a face that faces the light source unit 51 side of the sealing member 82. The sheet member 86 is a member made of a harder material than the sealing member 82. An acrylic plate with a thin thickness, (for example, 0.5 mm or less) is suitable as the sheet member 86. The sheet member 86 is made of a material that has a lower coefficient of kinetic friction than the sealing member 82. Support portions 101B are provided in the vicinity of the opening 101c of the casing 101 (see FIG. 9). Spring portions 81A are provided in the plate spring 81. The spring portions 81A abut against the support portions 101B when the plate spring 81 is inserted between the leading end portion 80A of the cylindrical portion 80 and the cylindrical lens 65 and seals the opening 101c. As illustrated in FIG. 7, one spring portion 81A is provided at each of the two ends of the plate spring 81. Retaining portions 81B for preventing the plate spring 81 from slipping out from the casing 101 when the plate spring 81 is mounted in the casing 101 are provided in the plate spring 81. Spring portions 81C that urge the cylindrical lens 65 downward (in the −Z direction) by an elastic force are provided in the plate spring 81. The spring portions 81C abut against an upper side face (on +Z direction side) of the cylindrical lens 65 and restrict displacement and movement of the cylindrical lens 65.

The plate spring 81 has the opening 83. As illustrated in FIG. 5B, a length a3 (opening width (horizontal)) in the main scanning direction of the opening 83 is, for example, 25.6 mm. A length b1 (opening width (vertical)) in the sub-scanning direction of the opening 83 is, for example, 12.3 mm. A distance a5 in the main scanning direction between the retaining portions 81B of the plate spring 81 is, for example, 19.8 mm. With regard to the two spring portions 81C of the plate spring 81, a distance a4 in the main scanning direction between abutting portions at which the spring portions 81C abut with the cylindrical lens 65 is, for example, 19 mm. When being mounted into the casing 101, the plate spring 81 is inserted in the insertion direction illustrated in FIG. 7. In the sealing member 82 that is affixed to the plate spring 81, a leading end part in the insertion direction is referred to as a leading end portion 82f.

As illustrated in FIG. 5A, at a normal time when the plate spring 81 is not mounted in the casing 101, that is, when the sealing member 82 is not compressed, a thickness a1 of the sealing member 82 that has been affixed to the plate spring 81 is, for example, 4.3 mm. As illustrated in FIG. 7, in the sheet member 86 that is affixed to the sealing member 82, a length d1 (opening width (horizontal)) of the opening in the main scanning direction is, for example, 26 mm. A length d3 (opening width (vertical)) of the opening in the sub-scanning direction is, for example, 13 mm. In the sheet member 86, a length d2 (width (horizontal) of sheet member) in the main scanning direction is, for example, 30 mm. A length d4 (width (vertical) of sheet member) of the sheet member 86 in the sub-scanning direction is, for example, 17 mm.

(Periphery of Opening 101c Provided in Leading End Portion 80A of Casing 101)

The cylindrical portions 80 of the casing 101 are formed so as to project from the side-wall face 101d of the casing 101 toward the rotary polygon mirror 42. The openings 101c through which laser beams emitted from the light source units 51 pass are provided on the rotary polygon mirror 42 sides of the cylindrical portions 80. As illustrated in FIGS. 5A and 5B and FIG. 6, the support portions 101B that support the plate spring 81 is provided in the vicinity of the opening 101c of each cylindrical portion 80.

As illustrated in FIG. 6, relative to the faces of the support portions 101B of the casing 101, the leading end portion 80A of the cylindrical portion 80 in which the opening 101c is formed projects further toward the rotary polygon mirror 42 side. A surface of the leading end portion 80A on a side facing the inserted plate spring 81 is an inclined surface. As illustrated in FIG. 5B, engagement portions 101D are provided on an upper end side forming the opening 101c of the leading end portion 80A of the cylindrical portion 80.

As illustrated in FIG. 5A, the inclining surface of the leading end portion 80A of the cylindrical portion 80 will be referred to as "inclining surface G". A space formed between the inclining surface G and the reference surfaces 101Aa of the support portions 101A will be referred to as "space Sp1". The length of the space Sp1 in the optical axis direction (length in thickness direction of sealing member 82 when the sealing member 82 is inserted) narrows in the insertion direction (the −Z direction) of the plate spring 81. That is, when the cylindrical lens 65 is mounted in the casing, the leading end portion 80A of the cylindrical portion 80 inclines so that a distance between the inclining surface G of the leading end portion 80A and the cylindrical lens 65 narrows in the insertion direction. An angle that the inclining surface G forms with respect to the bottom face 101f of the casing 101 will be referred to as "angle α". As illustrated in FIG. 6, a length c1 (width) of the leading end portion 80A forming the opening 101c is, for example, 31.3 mm in the main scanning direction.

Figure 9:
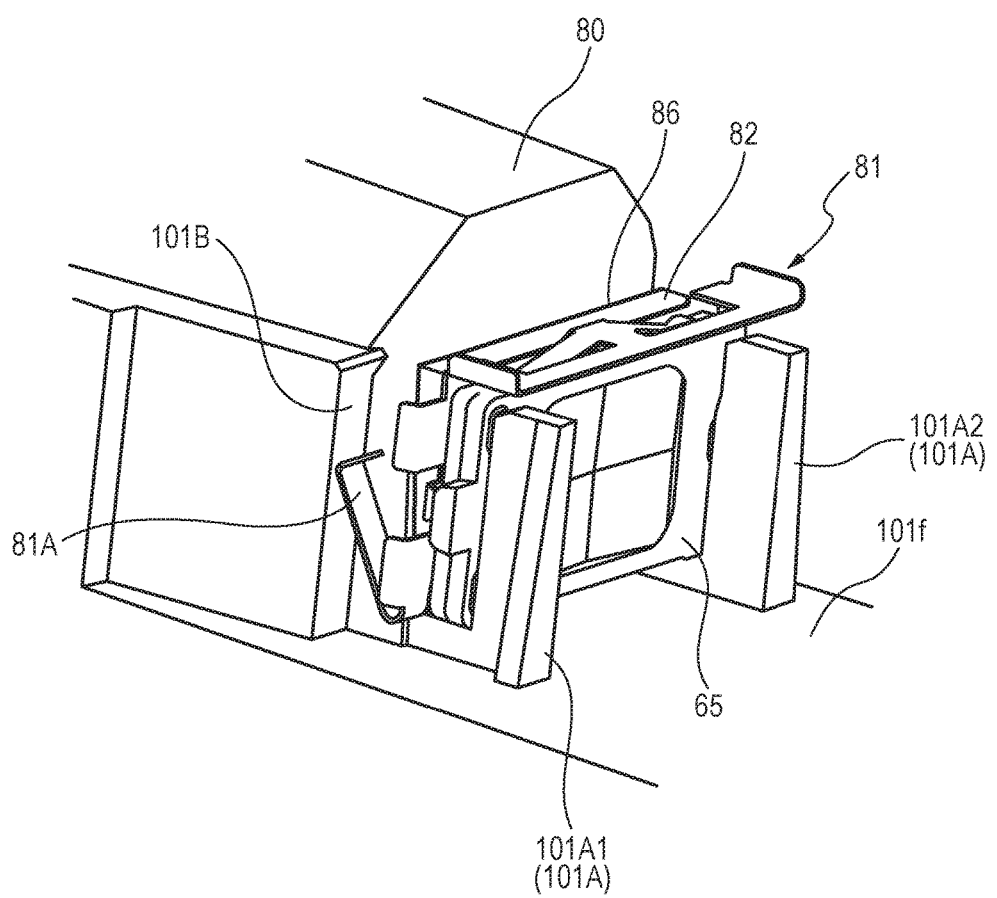
FIG. 9 is a perspective view illustrating the periphery of the opening of the cylindrical portion when mounting a sealing member according to the exemplary embodiment.

FIG. 8A is a view illustrating the manner of inserting the plate spring 81 between the cylindrical lens 65 and the leading end portion 80A of the cylindrical portion 80 after the cylindrical lens 65 is mounted in the casing 101, and is a view as viewed from the same direction as FIG. 5A. FIG. 8B is a view illustrating a state when the plate spring 81 is inserted between the casing 101 and the cylindrical lens 65, and the opening 101c provided in the leading end portion 80A of the cylindrical portion 80 is sealed, and is a view as viewed from the same direction as FIG. 8A. FIG. 9 is a perspective view of the state illustrated in FIG. 8B as viewed from the rotary polygon mirror 42 side.

As illustrated in FIG. 8A, the cylindrical lens 65 is temporarily placed on the support surfaces 101Ac of the support portions 101A so as to contact the reference surfaces 101Aa of the support portions 101A with respect to the casing 101. Thereafter, the plate spring 81 is inserted from above (the +Z-axis direction).

As illustrated in FIG. 8B, the spring portions 81A of the plate spring 81 change shape so as to fit in a clearance between the support portions 101B of the casing 101 and the cylindrical lens 65. By this means, the cylindrical lens 65 is urged in the direction in which the rotary polygon mirror 42 is provided and thereby fixed in the casing 101, and the opening 101c provided in the leading end portion 80A of the cylindrical portion 80 is sealed. After the retaining portions 81B of the plate spring 81 pass through the engagement portions 101D constituted by a part of the leading end portion 80A forming the opening 101c of the casing 101, elastic deformation of the retaining portions 81B is released and the retaining portions 81B enter into the bottom part of the engagement portions 101D. By this means, the retaining portions 81B become caught in the engagement portions 101D, and thereby inhibit upward (the +Z direction) movement of the plate spring 81, thus preventing the plate spring 81 from slipping out (see FIG. 5B and FIG. 6).

As illustrated in FIG. 7, the opening 83, through which the laser beams emitted from the light source units 51 pass, is provided in the plate spring 81, the sealing member 82 and the sheet member 86. By this means, the laser beams emitted from the light source units 51 are incident to the cylindrical lens 65 without the path thereof being obstructed by the plate spring 81, the sealing member 82, and the sheet member 86. Thus, the cylindrical lens 65 is fixed and the opening 101c of the cylindrical portion 80 is sealed by the plate spring 81. In the present exemplary embodiment, a hole other than the opening 101c of the cylindrical portion 80 is not provided in the casing 101, and the rotary polygon mirror 42 is isolated from external air of the optical scanning apparatus 40 as a result of the upper cover 69 being mounted on the casing 101.

[Configuration in Vicinity of Abutting Faces of Cylindrical Portion Against Sheet Member]

As illustrated in FIG. 8A, the leading end portion 80A (contact face 80A) of the cylindrical portion 80 has the inclining surface G that inclines toward the bottom face 101f of the casing 101. A space into which the plate spring 81 is to be inserted is formed by the inclining surface G of the cylindrical portion 80 and a face 65B on the light source side of the cylindrical lens 65. This space will be referred to as "space Sp2". The space Sp2 narrows progressively toward the inner side in the insertion direction of the sealing member 82, that is, toward the bottom side in FIG. 8A. In the space Sp2, a distance e1 (width in thickness direction of sealing member 82) in the optical axis direction at the upper end at which insertion of the plate spring 81 is started is, for example, 3.8 mm. A distance e2 indicates a distance when the plate spring 81 is inserted into the space Sp2, and the leading end of the plate spring 81 is at a position A that will be described later referring to FIG. 11A, and the distance e2 is, for example, 2.7 mm.

When the plate spring 81 is inserted into the space Sp2, the leading end side (downstream end) in the insertion direction of the sealing member 82 that is affixed to the plate spring 81 is sandwiched between the leading end portion 80A and the plate spring 81 and is gradually squashed. By this means, during assembly, the amount of the sealing member 82 that is squashed at the moment the sealing member 82 is inserted is kept to a small amount, and the workability improves. A height e3 (distance in the Z direction) of each support portion 101B of the casing 101 from the bottom face 101f of the casing 101 is, for example, 20.3 mm.

As illustrated in FIGS. 5A and 5B, the leading end portion 80A forming the opening 101c of the cylindrical portion 80 forms a face of an outlet of the opening 101c, and each sloping surface 85 forms a part of an inner wall face of the opening 101c. The sloping surfaces 85 form a V-shape, and the lower end of the outlet of the opening 101c is a V-shape. In each sloping surface 85, a slope is provided so that the width of the opening 101c becomes progressively narrower toward the inner side in the insertion direction of the sealing member 82, that is, in the downward direction (the −Z direction) in FIG. 5B. The opening 101c is formed so that a width in a first direction that is orthogonal to the insertion direction and is also orthogonal to the normal direction of the opening 101c becomes progressively narrower in the insertion direction of the plate spring 81. The sloping surfaces 85 slope so that a distance in the Z direction to the bottom face 101f of the casing 101 becomes shorter from two end portions of the leading end portion 80A toward the center in the main scanning direction. That is, the shape formed by the sloping surfaces 85 is a downwardly protruding shape, and is a V-shape. The opening 101c of the leading end portion 80A of the cylindrical portion 80 is formed so that the width in the main scanning direction narrows in the insertion direction.

A length b4 of the opening 101c in the sub-scanning direction (width (vertical) of opening 101c) at a portion 87 (tip of the V-shape) at which the distance between each sloping surface 85 and the bottom face 101f is shortest is, for example, 13.6 mm. A length a9 of the opening 101c of the cylindrical portion 80 (width (horizontal) of opening 101c) in the main scanning direction is, for example, 25.9 mm. At the leading end portion 80A of the cylindrical portion 80, a length b5 (width (vertical) of thinnest part of upper end portion), that is the shortest among the lengths of a frame portion of the upper end of the opening 101c in the sub-scanning direction, is, for example, 2 mm.

Figure 14:
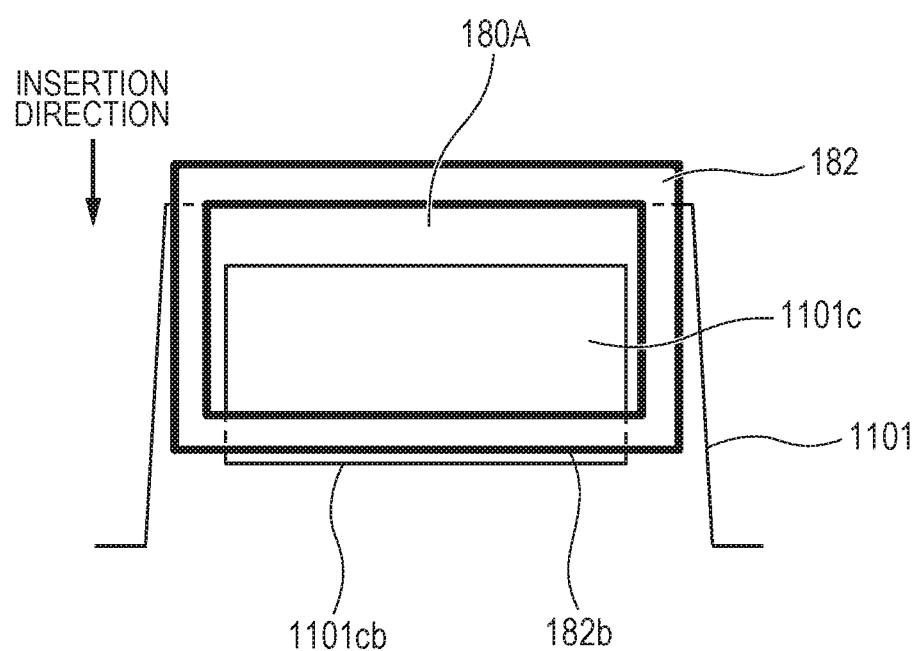
FIG. 14 is a front view illustrating the periphery of an opening in a casing of an optical scanning apparatus according to a comparative example.

As described above referring to FIG. 14, in the comparative example the lower end portion 1101cb of the opening 1101c of the casing 1101 and the lower end portion 182b of the elastic member 182 are parallel. An angle formed by the lower end portion 1101cb of the opening 1101c of the casing 1101 and the lower end portion 182b of the elastic member 182 is approximately 0°. In contrast, the sloping surfaces 85 forming the lower end portion of the opening 101c are not parallel to the leading end portion 82f in the insertion direction of the sealing member 82, and the sealing member 82 is inserted while forming a predetermined angle with respect to the sloping surfaces 85. The larger that the angle formed by each sloping surface 85 of the leading end portion 80A of the casing 101 and the leading end portion 82f of the sealing member 82 is, the better. In other words, the more acute the angle of the V-shape that is the downwardly protruding shape of the opening 101c is, the better. However, the more acute the angle of the V-shape of the opening 101c is, the deeper the depth of the lower end portion of the opening 101c becomes. The deeper that the depth of the lower end portion of the opening 101c is made, the greater that the overall size of the opening 101c must be made to secure the optical paths of the laser beams emitted from the light source units 51. Therefore, an angle formed by each sloping surface 85 of the leading end portion 80A of the casing 101 and the leading end portion 82f of the sealing member 82 is made 90° or less, for example, 85°. By this means, the sloping surfaces 85 of the leading end portion 80A forming the opening 101c and the leading end portion 82f of the sealing member 82 come in contact while being distorted, and the contact width therebetween decreases in comparison to the comparative example. By setting the angle to, for example, 85°, it is not necessary to design the V-shaped (or U-shaped) leading end of the opening 101c to be deep.

Figure 10:
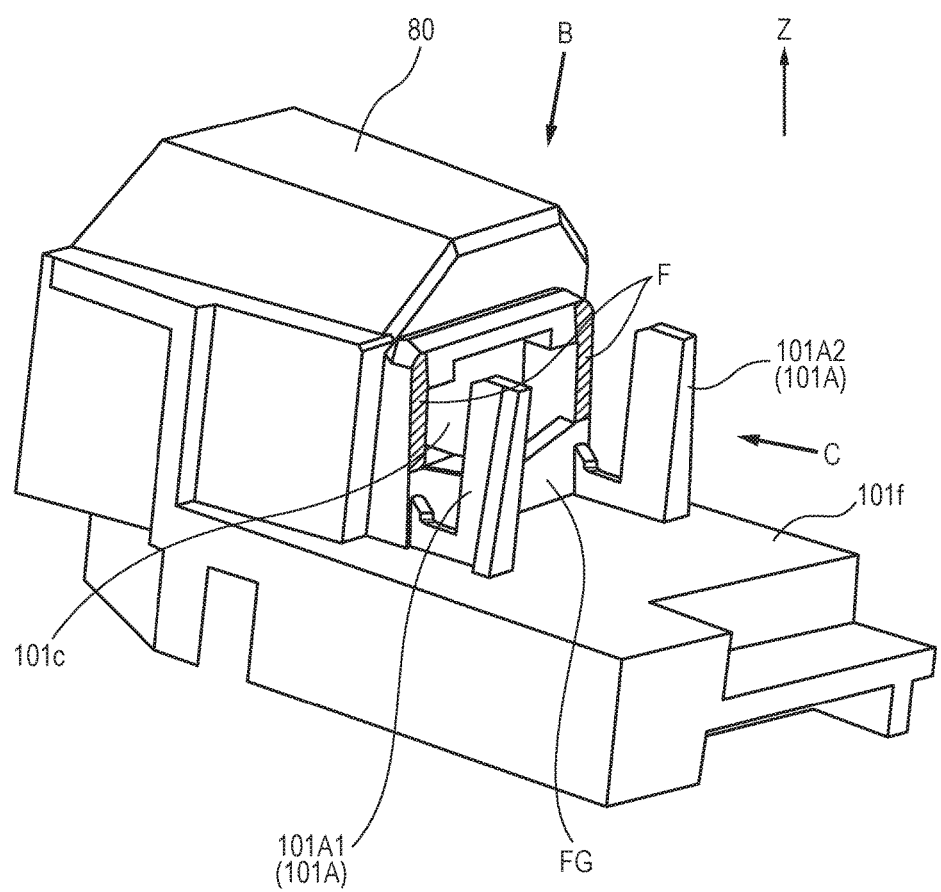
FIG. 10 is a perspective view illustrating the configuration around the opening of the cylindrical portion according to the exemplary embodiment.
Figure 11A:
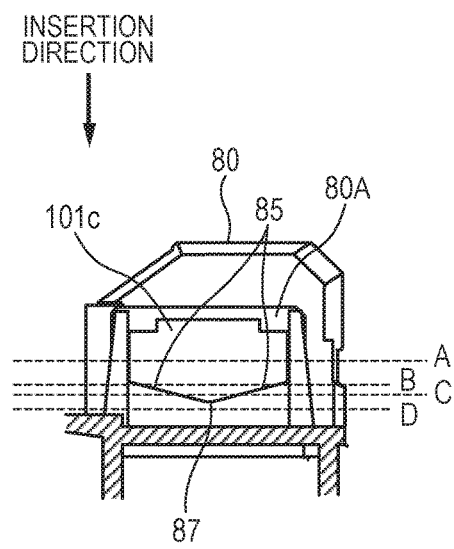
FIG. 11A illustrates the cross-sectional shape of the sealing member during the assembly process according to the exemplary embodiment.
Figure 11B:
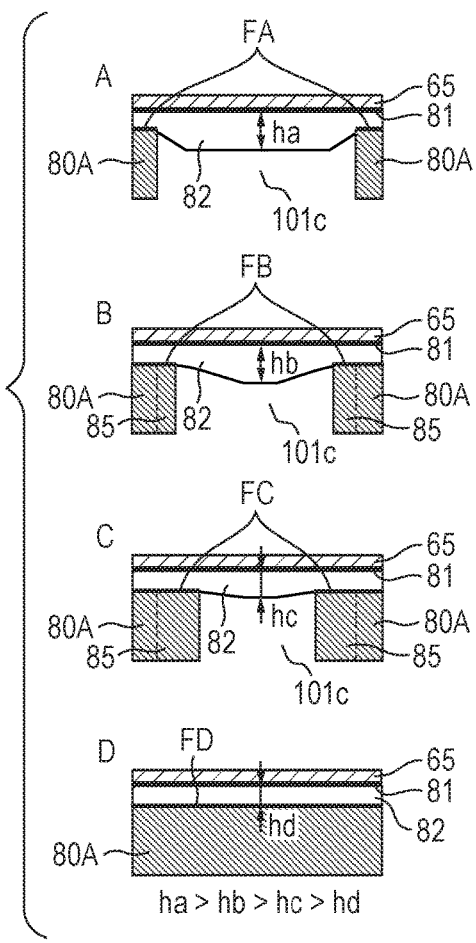
FIG. 11B illustrates the cross-sectional shape of the sealing member during the assembly process according to the exemplary embodiment.

FIG. 10 is a perspective view of the opening 101c of the cylindrical portion 80 as viewed from the rotary polygon mirror 42 side. FIG. 11B is a view illustrating cross-sections of the leading end portion 82f of the sealing member 82 when the plate spring 81 is being inserted into the casing 101, as viewed from a B direction (upward (the +Z direction)) in FIG. 10. FIG. 11A is a view illustrating respective positions A to D as positions of the leading end portion 82f of the sealing member 82 during the course of inserting the plate spring 81, as viewed from a C direction in FIG. 10. The positions A to D in FIG. 11A correspond to cross-sections A to D in FIG. 11B. A contact region between the sealing member 82 and the leading end portion 80A of the cylindrical portion 80 spreads from the two end portions of the opening 101c to the center part in the main scanning direction as the plate spring 81 is inserted in the insertion direction.

The thickness a1 of the sealing member 82 at a normal time is, for example, 4.3 mm, and the distance e1 at the upper end of the space Sp2 is, for example, 3.8 mm. The sealing member 82 is thicker than the distance e1 that is the widest portion among the distances between the inclining surface G of the leading end portion 80A of the cylindrical portion 80 and the cylindrical lens 65. When inserting the plate spring 81 into the space Sp2, the leading end portion 82f of the sealing member 82 in the insertion direction of the sealing member 82 is compressed and inserted into the space Sp2 by a worker. When the plate spring 81 is begun to be inserted into the space Sp2, the leading end portion 82f of the sealing member 82 reaches the position A. At the position A, the leading end portion 80A of the cylindrical portion 80 forms the opening 101c having the length a9 (for example, 25.9 mm) (predetermined width). In the sealing member 82, a portion that does not contact the leading end portion 80A of the cylindrical portion 80 projects toward the inside (light source unit 51 side) of the cylindrical portion 80 under an elastic force. At this time, a thickness of the sealing member 82 in the optical axis direction is "ha" at a thickest portion. During a period from when the plate spring 81 is begun to be inserted into the space Sp2 until the plate spring 81 arrives at the position B, the sealing member 82 is sandwiched between regions F as first regions that are indicated by hatching in FIG. 10 and the cylindrical lens 65. By this means, the state shown at position A in FIG. 11B is produced. Contact regions between the sealing member 82 and the leading end portion 80A of the cylindrical portion 80 at the position A will be referred to as "contact regions FA".

When the plate spring 81 is inserted further, the leading end portion 82f of the sealing member 82 arrives at the position B. At the position B, the leading end portion 82f of the sealing member 82 starts to contact end portions of the sloping surfaces 85 of the leading end portion 80A of the cylindrical portion 80. Consequently, portions that start to contact against the sloping surfaces 85 of the sealing member 82 are squashed by the sloping surfaces 85. At this time, the thickness of the sealing member 82 in the optical axis direction is "hb" at a thickest portion. During a period until the plate spring 81 arrives at the position D from the position B, the sloping surfaces 85 of the opening 101c and the leading end portion 82f of the sealing member 82 come in contact so as to intersect, and therefore are in a state of point contact. Because of being in a state of point contact, it is difficult for the leading end portion 82f of the sealing member 82 to run onto the sloping surfaces 85 of the opening 101c. In FIG. 11B, imaginary lines indicating a boundary with the sloping surfaces 85 are shown by dashed lines in the leading end portion 80A at position B and position C. The contact regions between the sealing member 82 and the leading end portion 80A of the cylindrical portion 80 at position B will be referred to as "contact regions FB".

When the plate spring 81 is inserted further, the leading end portion 82f of the sealing member 82 arrives at the position C. At the position C, the area with which the leading end portion 82f of the sealing member 82 contacts the sloping surfaces 85 of the leading end portion 80A of the cylindrical portion 80 becomes greater than when at the position B. Therefore, the regions of the sealing member 82 that are squashed by the sloping surfaces 85 become greater than the regions of the sealing member 82 that are squashed by the sloping surfaces 85 when the leading end portion 82f of the sealing member 82 is at the position B. At this time, the thickness of the sealing member 82 in the optical axis direction is "hc" at the thickest portion. Contact regions between the sealing member 82 and the leading end portion 80A of the cylindrical portion 80 at the position C will be referred to as "contact regions FC".

When the plate spring 81 is inserted further, the leading end portion 82f of the sealing member 82 arrives at the position D. At the position D, the leading end portion 82f in the insertion direction of the sealing member 82 is beyond a deepest portion 87 of the sloping surfaces 85 and contacts the leading end portion 80A of the cylindrical portion 80. At the position D, the sealing member 82 is squashed all along the main scanning direction, and the thickness of the sealing member 82 in the optical axis direction is a uniform thickness "hd". The contact region between the sealing member 82 and the leading end portion 80A of the cylindrical portion 80 at the position D will be referred to as "contact region FD". The thicknesses at the respective positions of the sealing member 82 satisfy the relation ha>hb>hc>hd. Further, the contact regions between the sealing member 82 and the leading end portion 80A of the cylindrical portion 80 satisfy the relation FA<FB<FC<FD. The contact regions FB to contact region FD correspond to a second region FG in FIG. 10. The second region is located further on the bottom face side of the casing relative to the first regions.

A region in which the sealing member 82 that is an elastic member is compressed by the cylindrical lens 65 and the sloping surfaces 85 expands in the central direction of the opening 101c in accordance with the insertion amount of the plate spring 81 into the space Sp2. The thickness of the center part of the sealing member 82 decreases in accordance with the insertion amount of the plate spring 81. As a result, even when the sealing member 82 is inserted from above, the sealing member 82 is prevented from running onto the sloping surfaces 85 of the leading end portion 80A of the cylindrical portion 80. Thus, the workability when mounting the plate spring 81 in the casing 101 improves. In addition, the sheet member 86 that is harder than the sealing member 82 is affixed to the surface of the sealing member 82. Consequently, the center part of the sealing member 82 is squashed to a greater degree by a displacement of the end portion of the sheet member 86. Therefore, the center part of the sealing member 82 that does not come in contact with the leading end portion 80A of the cylindrical portion 80 is compressed during the course of insertion, and friction between the sealing member 82 and the casing 101 is reduced, thus further enhancing the assemblability.

The relation between the sealing member 82 and the shape on the cylindrical portion 80 side is as follows. During the course of inserting the sealing member 82, an ridge line on the downstream end side on the sealing member 82 side and an ridge line forming one section of the opening 101c on the cylindrical portion 80 side (an ridge line on the cylindrical portion 80 side on the downstream side in the insertion direction of the sealing member 82) intersect. That is, during the course of inserting the sealing member 82, the ridge line on the downstream end side on the sealing member 82 side and the ridge line forming one section of the opening 101c on the cylindrical portion 80 side become non-parallel with respect to each other. During the course of inserting the sealing member 82 (cross-section C in FIG. 11B), the sealing member 82 runs onto the leading end portion 80A on one side of a portion at which the ridge line on the sealing member 82 side intersects the ridge line on the cylindrical portion 80 side. On the other side of the portion at which the ridge line on the sealing member 82 side intersects the ridge line on the cylindrical portion 80 side, the sealing member 82 enters a state in which the sealing member 82 faces the inner space of the opening 101c. When the sealing member 82 is inserted, portions (contact portions) at which the ridge line on the sealing member 82 side intersects the ridge line on the cylindrical portion 80 side move, and the portion of the sealing member 82 that runs onto the leading end portion 80A increases. In a case where the ridge line on the sealing member 82 side goes beyond the deepest portion 87 of the sloping surfaces 85 in the direction toward the lower side, the downstream end side of the sealing member 82 contacts the leading end portion 80A and thus the circumference of the opening 101c is sealed.

[Modification of Opening of Cylindrical Portion]

Figure 12A:
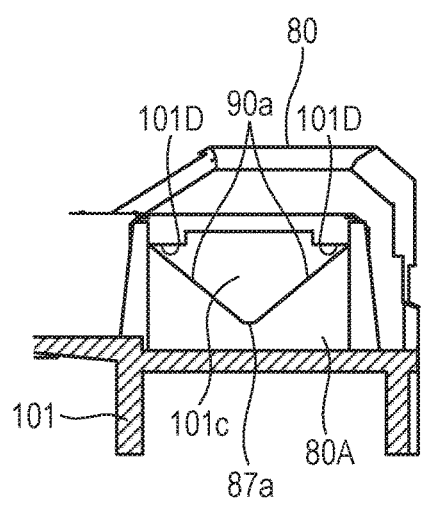
FIG. 12A illustrates a modification of the shape of the opening of the cylindrical portion according to the exemplary embodiment.
Figure 12B:
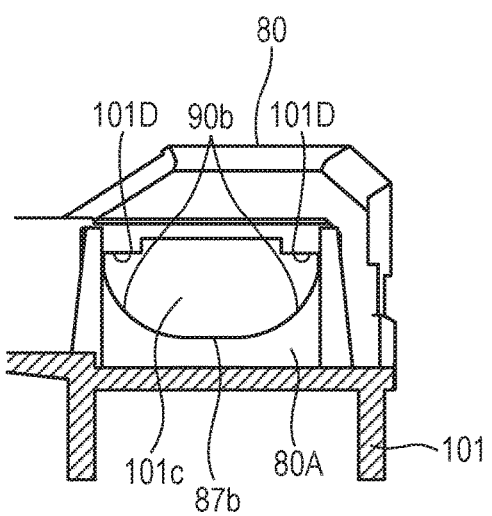
FIG. 12B illustrates a modification of the shape of the opening of the cylindrical portion according to the exemplary embodiment.

FIG. 12A illustrates a different example of the leading end portion 80A of the cylindrical portion 80 of the casing 101 that forms the opening 101c. Tapers 90a are formed from the engagement portions 101D constituted by one part of the leading end portion 80A of the cylindrical portion 80 toward a portion 87a. Slopes of the tapers 90a are greater than those of the sloping surfaces 85 illustrated in FIG. 11A. FIG. 12B illustrates a different example of the leading end portion 80A of the cylindrical portion 80 of the casing 101 that forms the opening 101c. Curved faces 90b (U-shape) is formed from the engagement portions 101D of the cylindrical portion 80 toward a portion 87b. The shape of the leading end portion 80A of the cylindrical portion 80 forming the opening 101c may be a shape in which a region in which the sealing member 82 is compressed expands in the main scanning direction in response to insertion of the plate spring 81.

[Modification of Sealing Member]

Figure 13A:
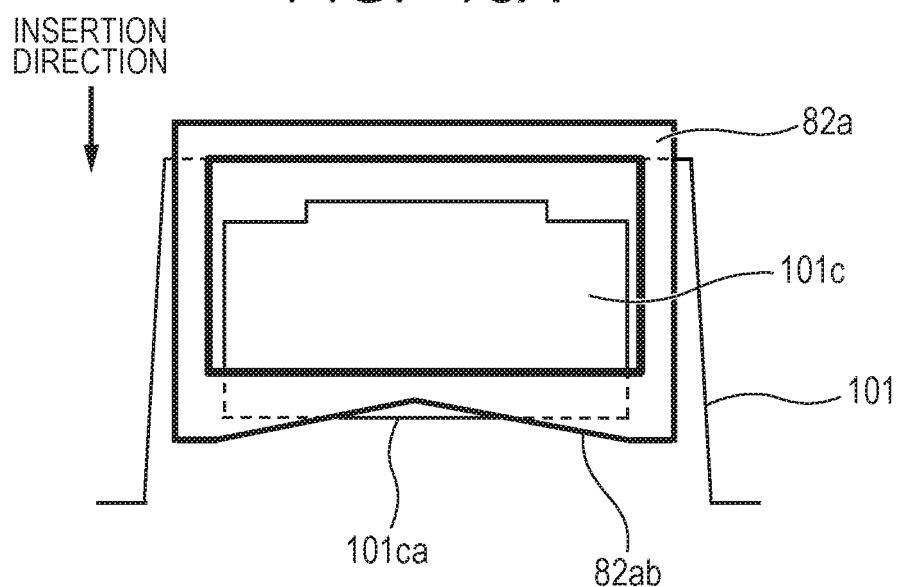
FIG. 13A illustrates a modification of the shape of the sealing member according to the exemplary embodiment.

FIG. 13A is a view illustrating a sealing member 82a as another modification of the sealing member, and is a view as viewed from the rotary polygon mirror 42 side. In FIG. 13A, a leading end frame portion 82ab has an inverted V-shape (upwardly convex shape) in the insertion direction of the sealing member 82a. For example, the shape of the leading end frame portion 82ab of the sealing member 82a on the bottom face 101f side of the casing 101 is made a shape that inclines so as to move away from the bottom face 101f from the end portions toward the center part. A sheet member (not illustrated) is made the same shape as the sealing member 82a. By making the sealing member 82a this shape, the assemblability can be enhanced even when the opening 101c of the casing 101 is a similar rectangular shape as in the comparative example, and is a shape such as that of the lower end portion 101ca. For example, the leading end frame portion 82ab may be an inverted U-shape (upwardly convex shape) in the insertion direction of the sealing member 82a.

Figure 13B:
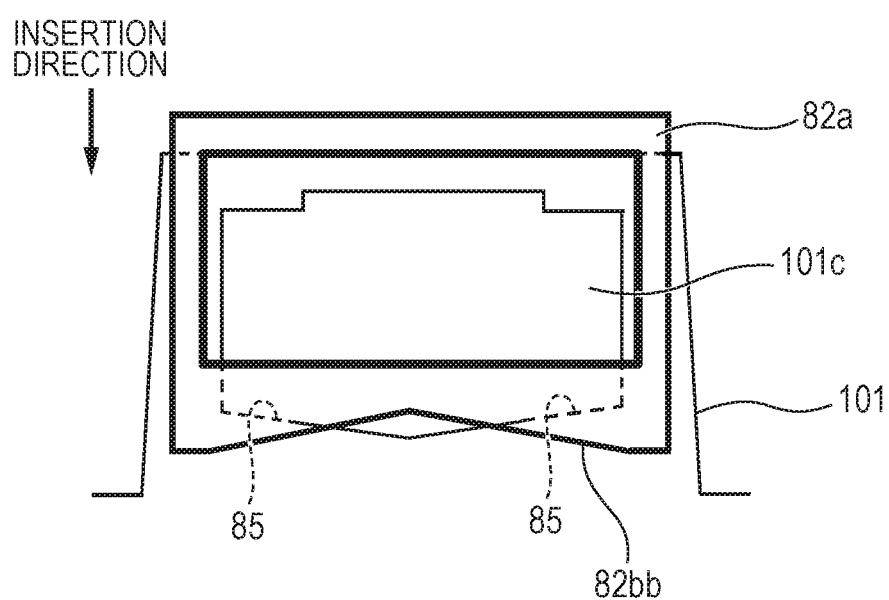
FIG. 13B illustrates a modification of the shape of the sealing member according to the exemplary embodiment.

As illustrated in FIG. 13B, the opening 101c having the shape as described above referring to FIGS. 5A and 5B may be sealed by the sealing member 82a. In FIG. 13B, a V-shape (downwardly convex shape) is formed by the sloping surfaces 85 of the leading end portion 80A forming the opening 101c. A leading end portion 82bb is an inverted V-shape (upwardly convex shape) in the insertion direction of the sealing member 82a. The opening 101c that is formed by the tapers 90a or the curved faces 90b described above referring to FIGS. 12A and 12B may be sealed by the sealing member 82a. In these cases also, the assemblability can be enhanced. For example, the lower end portion of the leading end portion 80A of the cylindrical portion 80 forming the opening 101c may be a V-shape (downwardly convex shape), and the leading end portion in the insertion direction of the sealing member may be an inverted U-shape (upwardly convex shape). As illustrated in FIGS. 13A and 13B, as a modification of the sealing member 82, the sealing member 82a is formed so that a distance in the insertion direction between the leading end portion in the insertion direction and the bottom face 101f increases from the two end portions toward the center part in the main scanning direction as the first direction.

In the exemplary embodiment, the sealing members 82 are disposed between the cylindrical lenses 65 and the casing 101. However, the light-transmitting members are not limited to the cylindrical lenses 65, and may be a glass plates that transmit the laser beams without having optical convergence power. In this way, using a simple configuration, the sealing members 82 are prevented from running onto the casing 101, and hence the rotary polygon mirror 42 can be blocked off from external air without lowering the optical properties of the optical scanning apparatus 40. Further, since each sealing member can be assembled from a single direction, which is the +Z-axis direction in the exemplary embodiments, the assemblability improves. Thus, according to the exemplary embodiments, in the vicinity of the opening of the cylindrical portion of the casing, the sealing members for sealing can be prevented from running onto an inner face thereof. That is, the occurrence of a sealing defect in the sealing members for sealing to be mounted in the casing can be suppressed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-025992, filed Feb. 15, 2017, which is hereby incorporated by reference herein in its entirety.

What is claimed is:

1. An optical scanning apparatus, comprising:
  a light source;
  a rotary polygon mirror constructed to deflect a laser beam is emitted from the light source;
  a casing having a bottom face on which the rotary polygon mirror is mounted, and a side wall which is erected from the bottom face and on which the light source is mounted;
  a cylindrical portion that extends from the side wall toward inside of the casing and through that the laser beam emitted from the light source passes, wherein a first opening through which the laser beam passes is formed in an extended leading end portion of the cylindrical portion;
  a light-transmitting member arranged between the cylindrical portion and the rotary polygon mirror, wherein the light-transmitting member is constructed to transmit the laser beam which has passed through the first opening;
  a plate spring having a second opening through which the laser beam passes, the plate spring being mounted in the casing by being inserted toward the bottom face of the casing to fix the light-transmitting member in the casing; and
  a sealing member having a third opening through which the laser beam passes, the sealing member being affixed to a face, which faces a side on which the light source is disposed, of the plate spring mounted in the casing, wherein the sealing member is constructed to seal a gap between the leading end portion of the cylindrical portion and the plate spring,
  wherein at least a part of the first opening is formed so that a width in a first direction, which is orthogonal to an insertion direction of the plate spring and a normal direction of the first opening, narrows progressively in the insertion direction,
  wherein there is a first region in a face of the leading end portion of the cylindrical portion on a side facing the plate spring, and wherein in the first region, a leading end portion of the sealing member in the insertion direction is constructed such that the leading end portion comes into contact with the face of the leading end portion of the cylindrical portion by the sealing member sandwiched with the leading end portion of the cylindrical portion and the plate spring when the plate spring is begun to be inserted in the insertion direction, and
  wherein there is a second region closer to the bottom face of the casing than the first region, and wherein in the second region, a compressed region, in which the leading end portion of the sealing member comes into contact with the face of the leading end portion of the cylindrical portion, is constructed such that the compressed region expands toward a center part from two end portions of the leading end portion of the sealing member in the first direction as the plate spring is inserted further in the insertion direction.

2. The optical scanning apparatus according to claim 1, wherein the sealing member is formed so that a distance in the insertion direction between the leading end portion of the sealing member and the bottom face increases toward the center part from the two end portions in the first direction.

3. The optical scanning apparatus according to claim 1, further comprising:
  a sheet member having a fourth opening through which the laser beam passes, the sheet member being affixed to a face of the sealing member facing a side on which the light source is disposed when the plate spring is mounted in the casing, and wherein the sheet member is harder than the sealing member.

4. The optical scanning apparatus according claim 1, wherein:
  the leading end portion of the cylindrical portion inclines so that a distance between a face of the leading end portion facing a side on which the light-transmitting member is disposed and the light-transmitting member narrows in the insertion direction.

5. The optical scanning apparatus according to claim 4, wherein the sealing member is thicker than a distance widest among distances between a face of the leading end portion of the cylindrical portion facing a side on which the light-transmitting member is disposed and the light-transmitting member.

6. The optical scanning apparatus according to claim 1, wherein the light-transmitting member is urged with respect to the casing by the plate spring toward a side on which the rotary polygon mirror is disposed to be fixed.

7. The optical scanning apparatus according to claim 1, wherein the light-transmitting member is comprised of a cylindrical lens causing and is constructed to cause the laser beam emitted from the light source to form an image on the rotary polygon mirror.

8. The optical scanning apparatus according to claim 1, wherein the light-transmitting member is comprised of a glass plate and is constructed to transmit the laser beam emitted from the light source.

9. The optical scanning apparatus according to claim 1, wherein the sealing member is comprised of an elastic member and is constructed so as to be compressed in an optical axis direction of the light-transmitting member when the plate spring is mounted in the casing.

10. An optical scanning apparatus, comprising:
  a light source;
  a rotary polygon mirror constructed to deflect a laser beam is emitted from the light source;
  a casing having a bottom face on which the rotary polygon mirror is mounted, and a side wall which is erected from the bottom face and on which the light source is mounted;
  a cylindrical portion that extends from the side wall toward inside of the casing and through that the laser beam emitted from the light source passes, wherein a first opening through which the laser beam passes is formed in an extended leading end portion of the cylindrical portion;

a light-transmitting member arranged between the cylindrical portion and the rotary polygon mirror, wherein the light-transmitting member is constructed to transmit the laser beam which has passed through the first opening;

a plate spring having a second opening through which the laser beam passes, the plate spring being mounted in the casing by being inserted toward the bottom face of the casing to fix the light-transmitting member in the casing; and a sealing member having a third opening through which the laser beam passes, the sealing member being affixed to a face, which faces a side on which the light source is disposed, of the plate spring mounted in the casing, wherein the sealing member is constructed to seal a gap between the leading end portion of the cylindrical portion and the plate spring, and wherein the sealing member is formed so that a distance in an insertion direction of the plate spring between a leading end portion of the sealing member in the insertion direction and the bottom face increases toward a center part from two end portions of the sealing member in a first direction which is orthogonal to the insertion direction and a normal direction of the first opening, wherein there is a first region in a face of the leading end portion of the cylindrical portion on a side facing the plate spring, and wherein in the first region, a leading end portion of the sealing member is constructed such that the leading end portion comes into contact with the face of the leading end portion of the cylindrical portion by the sealing member sandwiched with the leading end portion of the cylindrical portion and the plate spring when the plate spring is begun to be inserted in the insertion direction, and wherein there is a second region closer to the bottom face of the casing than the first region, and wherein in the second region, a compressed region, in which the leading end portion of the sealing member comes into contact with the face of the leading end portion of the cylindrical portion, is constructed such that the compressed region expands toward the center part from the two end portions of the leading end portion of the sealing member in the first direction as the plate spring is inserted further in the insertion direction.

11. The optical scanning apparatus according to claim 10, wherein the first opening is formed so that a width in the first direction narrows in the insertion direction.

12. The optical scanning apparatus according to claim 10, further comprising:

a sheet member having a fourth opening through which the laser beam passes, the sheet member being affixed to a face of the sealing member facing a side on which the light source is disposed when the plate spring is mounted in the casing, and wherein the sheet member is harder than the sealing member.

13. The optical scanning apparatus according claim 10, wherein:

the leading end portion of the cylindrical portion inclines so that a distance between a face of the leading end portion facing a side on which the light-transmitting member is disposed and the light-transmitting member narrows in the insertion direction.

14. The optical scanning apparatus according to claim 10, wherein the light-transmitting member is urged with respect to the casing by the plate spring toward a side on which the rotary polygon mirror is disposed to be fixed.

15. The optical scanning apparatus according to claim 10, wherein the light-transmitting member is comprised of a cylindrical lens and is constructed to cause the laser beam emitted from the light source to form an image on the rotary polygon mirror.

16. The optical scanning apparatus according to claim 10, wherein the light-transmitting member is comprised of a glass plate and is constructed to transmit the laser beam emitted from the light source.

17. The optical scanning apparatus according to claim 10, wherein the sealing member is comprised of an elastic member and is constructed so as to be compressed in an optical axis direction of the light-transmitting member when the plate spring is mounted in the casing.

18. An image forming apparatus comprising:

an optical scanning apparatus;

a photosensitive member on which a latent image is formed by being scanned with a laser beam from the optical scanning apparatus;

a developing unit that develops the latent image formed on the photosensitive member with toner to form a toner image; and a transfer unit that transfers the toner image formed by the developing unit to a transfer target, the optical scanning apparatus comprising:

a light source;

a rotary polygon mirror constructed to deflect a laser beam emitted from the light source;

a casing having a bottom face on which the rotary polygon mirror is mounted, and a side wall which is erected from the bottom face and on which the light source is mounted;

a cylindrical portion that extends from the side wall toward inside of the casing and through that the laser beam emitted from the light source passes, wherein a first opening through which the laser beam passes is formed in an extended leading end portion of the cylindrical portion;

a light-transmitting member arranged between the cylindrical portion and the rotary polygon mirror, wherein the light-transmitting member is constructed to transmit the laser beam which has passed through the first opening;

a plate spring having a second opening through which the laser beam passes, the plate spring being mounted in the casing by being inserted toward the bottom face of the casing to fix the light-transmitting member in the casing; and a sealing member having a third opening through which the laser beam passes, the sealing member being affixed to a face, which faces a side on which the light source is disposed, of the plate spring mounted in the casing, wherein the sealing member is constructed to seal a gap between the leading end portion of the cylindrical portion and the plate spring, wherein at least a part of the first opening is formed so that a width in a first direction, which is orthogonal to an insertion direction of the plate spring and a normal direction of the first opening, narrows progressively in the insertion direction, wherein there is a first region in a face of the leading end portion of the cylindrical portion on a side facing the plate spring, and wherein in the first region, a leading end portion of the sealing member in the insertion direction is constructed such that the leading end portion comes into contact with the face of the leading end portion of the cylindrical portion by the sealing member sandwiched with the leading end portion of the cylindrical portion and the plate spring when the plate spring is begun to be inserted in the insertion direction, and wherein there is a second region closer to the bottom face of the casing than the first region, and wherein in the second region, a compressed region, in which the leading end portion of the sealing member comes into contact with the face of the leading end portion of the cylindrical portion, is constructed such that the compressed region expands toward a center part from two end portions of the leading end portion of the sealing member in the first direction as the plate spring is inserted further in the insertion direction.

* * * * *